(12) United States Patent
Treister et al.

(10) Patent No.: US 7,222,166 B2  
(45) Date of Patent: May 22, 2007

(54) APPROACH FOR MANAGING COMMUNICATIONS CHANNELS BASED ON PERFORMANCE AND TRANSFERRING FUNCTIONS BETWEEN PARTICIPANTS IN A COMMUNICATIONS ARRANGEMENT

(75) Inventors: Bijan Treister, Kew (AU); Hongbing Gan, Carlton North (AU); Efstratios Skafidas, Coburg (AU)

(73) Assignee: Bandspeed, Inc., Austin, TX (US)

( * ) Notice: Subject to any disclaimer, the term of this patent is extended or adjusted under 35 U.S.C. 154(b) by 804 days.

(21) Appl. No.: 10/052,019

(22) Filed: Jan. 16, 2002

(65) Prior Publication Data

US 2002/0116460 A1 Aug. 22, 2002

Related U.S. Application Data

(60) Provisional application No. 60/264,593, filed on Jan. 25, 2001, provisional application No. 60/264,345, filed on Jan. 25, 2001, provisional application No. 60/264,348, filed on Jan. 25, 2001.

(51) Int. Cl.  
*G06F 15/173* (2006.01)  
*G06F 15/16* (2006.01)  
*G06G 15/16* (2006.01)

(52) U.S. Cl. ...................... 709/223; 709/208

(58) Field of Classification Search ............. 709/204, 709/208, 223, 225  
See application file for complete search history.

(56) References Cited

U.S. PATENT DOCUMENTS 4,716,573 A 12/1987 Bergstrom et al.  
4,780,885 A 10/1988 Paul et al.  
5,317,568 A 5/1994 Bixby et al.

(Continued)

FOREIGN PATENT DOCUMENTS

WO WO 00/60896 10/2000

(Continued)

OTHER PUBLICATIONS

Lawrey; Eric et al., "Adaptive Frequency Hopping for Multiuser OFDM," Second International Conference on Information, Communications & Signal Processing, ICICS'99, Dec. 7-10, 1999, pp. 1-5.

(Continued)

*Primary Examiner*—John B. Walsh  
(74) *Attorney, Agent, or Firm*—Hickman Palermo Truong & Becker LLP

(57) ABSTRACT

A novel approach for selecting communications channels and participants with which to communicate based on channel performance and transferring management functions between participants in a communications arrangement is disclosed. According to one aspect of the invention, a particular channel is selected based on channel performance and channel identification data is provided to a participant that sends a response on a channel selected based on the channel identification data. According to another aspect of the invention, a particular participant is selected from a group of participants based on the performance of a particular channel. According to yet another aspect, an associate master participant is selected to assume responsibilities for functions assigned to the master participant if any of a set of handoff criteria are satisfied. For example, the associate master participant may assume the role of the master participant if the master participant can no longer perform the functions.

30 Claims, 20 Drawing Sheets

U.S. PATENT DOCUMENTS

| | | | |
|---|---|---|---|
| 5,323,447 | A | 6/1994 | Gillis et al. |
| 5,394,433 | A | 2/1995 | Bantz et al. |
| 5,418,839 | A | 5/1995 | Knuth et al. |
| 5,541,954 | A | 7/1996 | Emi |
| 5,574,979 | A | 11/1996 | West |
| 5,649,291 | A | 7/1997 | Tayloe |
| 5,726,978 | A | 3/1998 | Frodigh et al. |
| 5,774,808 | A | 6/1998 | Särkioja et al. |
| 5,781,861 | A * | 7/1998 | Kang et al. ............... 455/442 |
| 5,844,522 | A | 12/1998 | Sheffer et al. |
| 5,873,036 | A | 2/1999 | Vucetic |
| 5,898,928 | A | 4/1999 | Karlsson et al. |
| 5,956,642 | A | 9/1999 | Larsson et al. |
| 6,009,332 | A | 12/1999 | Haartsen |
| 6,169,761 | B1 | 1/2001 | Marcoccia et al. |
| 6,240,126 | B1 | 5/2001 | Ohashi et al. |
| 6,549,784 | B1 | 4/2003 | Kostic et al. |
| 6,601,101 | B1 | 7/2003 | Lee et al. |
| 6,633,761 | B1 | 10/2003 | Singhal et al. |
| 6,650,872 | B1 | 11/2003 | Karlsson |
| 6,687,239 | B1 | 2/2004 | Koprivica |
| 6,694,147 | B1 | 2/2004 | Viswanath et al. |
| 6,700,875 | B1 | 3/2004 | Schroeder et al. |
| 6,704,346 | B1 | 3/2004 | Mansfield |
| 6,745,034 | B2 | 6/2004 | Wang et al. |
| 6,760,317 | B1 | 7/2004 | Honkanen |
| 6,975,603 | B1 | 12/2005 | Dicker et al. |
| 2002/0122462 | A1 | 9/2002 | Batra et al. |
| 2005/0223115 | A1 | 10/2005 | Hanson et al. |

FOREIGN PATENT DOCUMENTS

| | | |
|---|---|---|
| WO | WO 01/03379 A1 | 1/2001 |

OTHER PUBLICATIONS

Zander, J. et al., "Adaptive frequency hopping in HF communications," IEE Proc-Commun., vol. 142, No. 2, Apr. 1995, pp. 99-105.

Martin Johnson, "HiperLAN/2-The Broadband Radio Transmission Technology Operating in the 5 GHz Frequency Band," pp. 1-22, 1999.

European Patent Office, "Communication pursuant to Article 96(2) EPC," Jun. 22, 2004, 5 pages.

"Clean Version of Amended Claims for Response to Official Comm. From Patent Examiner," EPO Patent Application No. 02709170.1, pp. 1-15.

Walter L. Davis, A MAC Layer submission for the High Rate 802.15.3 Standard, Project: IEEE P802.15 Working Group for Wireless Personal Area Networks (WPANs), Sep. 2000, XP 002220853, pp. 1-57.

Jeyhan Karaoguz, "Multi-Rate QAM Physical Layer (8-40 Mbps) Proposal for High Rate WPAN," Project: IEEE P802.15 Working Group for Wireless Personal Area Networks (WPANs), Oct. 20, 2000, XP002220854, pp. 1-39.

IEE Proc.-Commun., vol. 142, No. 2, Apr. 1995, entitled "Adaptive frequency hopping in HF communications", by J. Zander, PhD and G. Malmgren, MSc, (pp. 99-105).

Fifth International Symposium on Signal Processing and its Applications, ISSPA '99 Brisbane, Australia, Aug. 22-25, 1999, entitled "Multiuser OFDM", by E. Lawrey, (pp. 761-764).

Gan et al., "Adaptive Frequency Hopping Implementation Proposals for IEEE 802.15.1/2 WPAN," Bandspeed Pty Ltd., Nov. 2000, pp. 1-28.

* cited by examiner

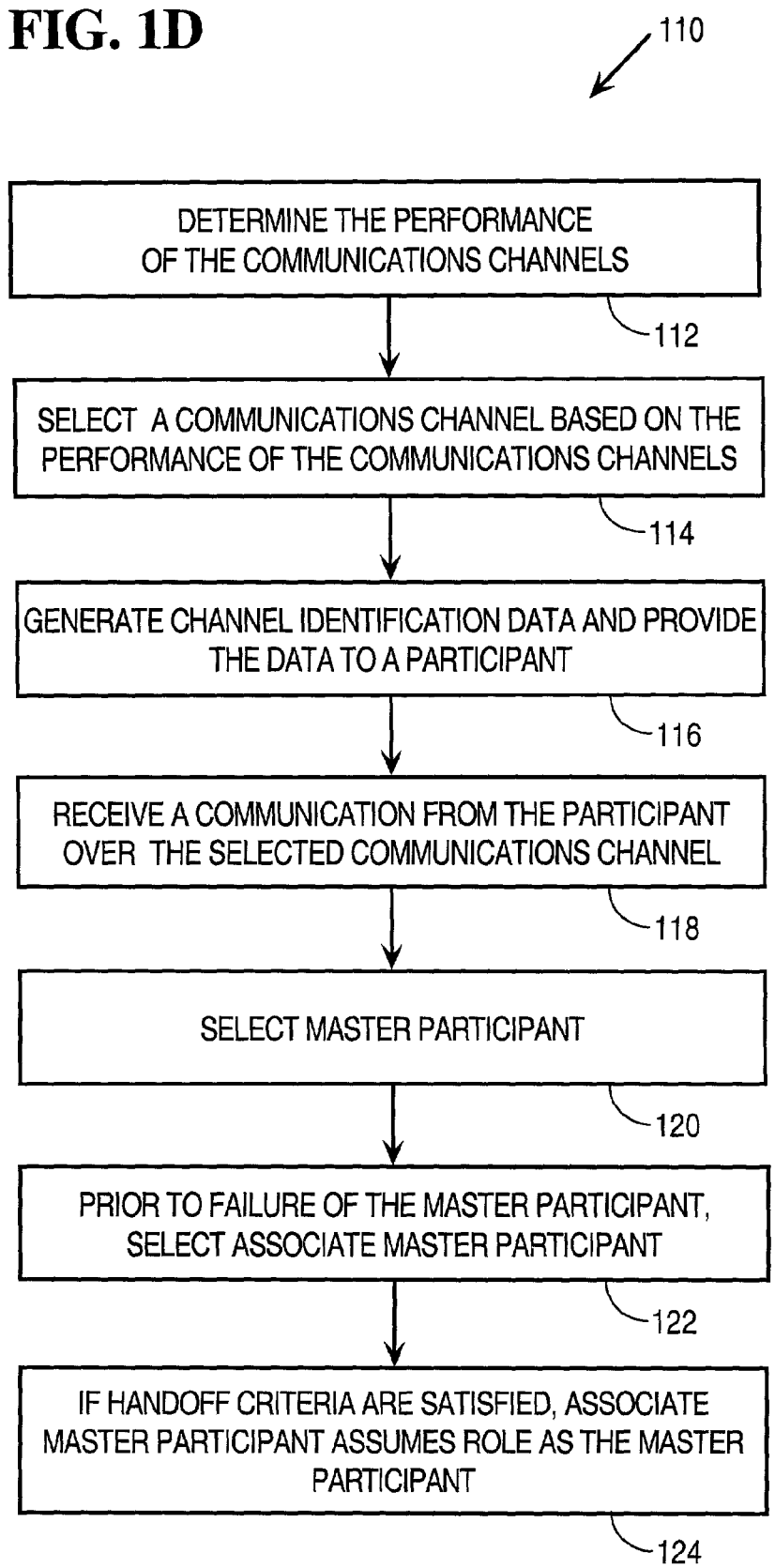

FIG. 2A

PERFORMANCE LOOKUP TABLE 200

| | CH 1 | CH 2 | CH 3 | CH 4 | ...... | CH n |
|---|---|---|---|---|---|---|
| SLAVE A | 1 | 10 | | 3 | ...... | 2 |
| SLAVE B | | | | | ...... | |
| SLAVE C | 0 | 9 | | 5 | ...... | 4 |
| ... | ... | ... | ... | ... | ... | ... |
| SLAVE nn | 2 | 9 | | 6 | ...... | 8 |

FIG. 2B

CLASSIFICATION LOOKUP TABLE 200

| | CH 1 | CH 2 | CH 3 | CH 4 | ...... | CH n |
|---|---|---|---|---|---|---|
| SLAVE A | NO | YES | | NO | ...... | NO |
| SLAVE B | | | | | ...... | |
| SLAVE C | NO | YES | | YES | ...... | NO |
| ... | ... | ... | ... | ... | ... | ... |
| SLAVE nn | NO | YES | | YES | ...... | YES |

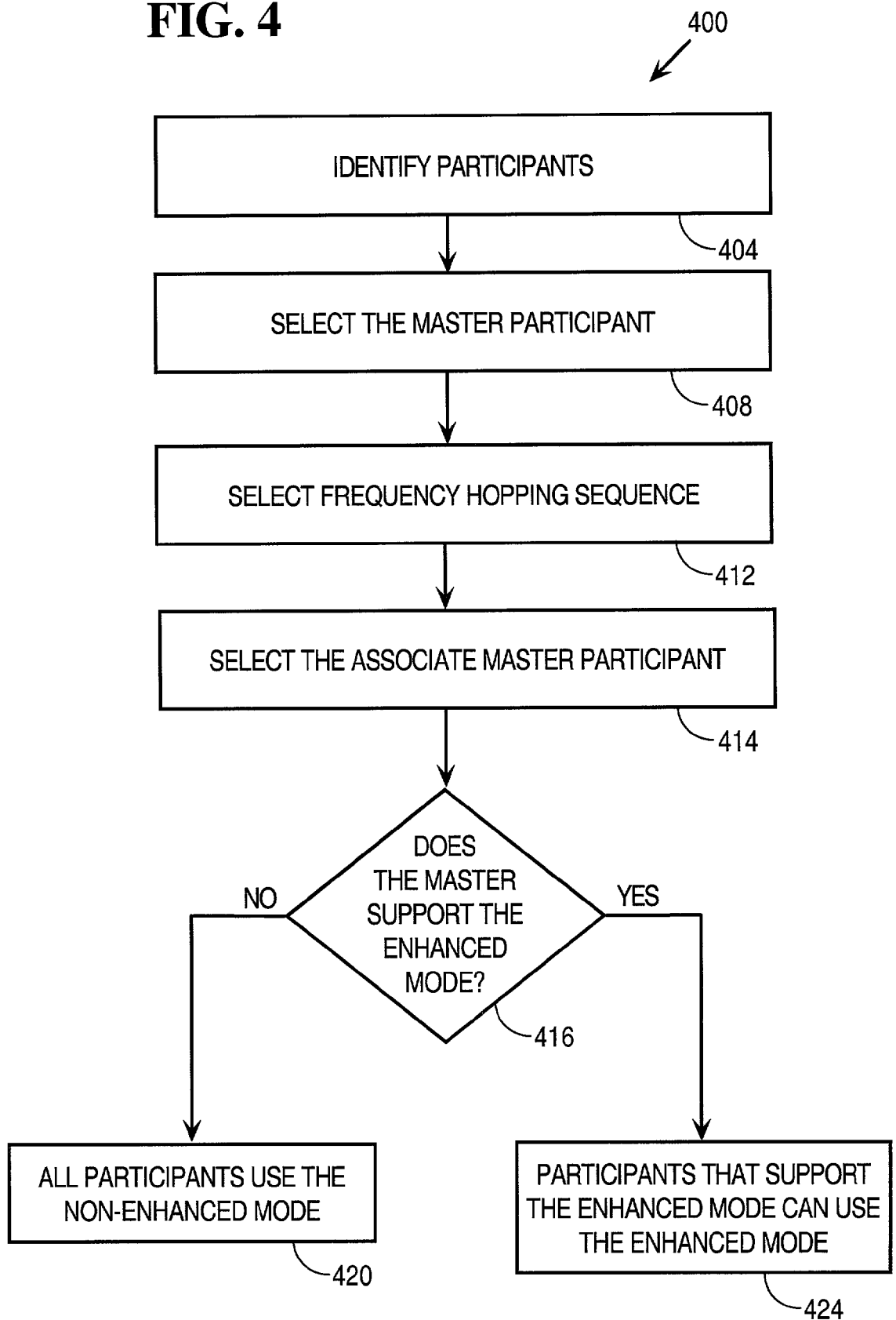

APPROACH FOR MANAGING COMMUNICATIONS CHANNELS BASED ON PERFORMANCE AND TRANSFERRING FUNCTIONS BETWEEN PARTICIPANTS IN A COMMUNICATIONS ARRANGEMENT

RELATED APPLICATIONS

This application claims domestic priority from (1) prior U.S. Provisional Patent Application Ser. No. 60/264,593, filed on Jan. 25, 2001, titled "A METHOD FOR NETWORK QUASI-ADAPTIVE FREQUENCY HOPPING MULTICHANNEL UTILISATION AND ADAPTIVE NETWORK CONTROL," naming as inventors Bijan Treister, Hongbing Gan, and Efstratios Skafidas, (2) prior U.S. Provisional Patent Application Serial No. 60/264,345, filed on Jan. 25, 2001, titled "A METHOD FOR NETWORK QUASI-ADAPTIVE FREQUENCY HOPPING MULTI-CHANNEL UTILISATION," naming as inventors Bijan Treister, Hongbing Gan, and Efstratios Skafidas, and (3) prior U.S. Provisional Patent Application Ser. No. 60/264,348, filed on Jan. 25, 2001, titled "A METHOD FOR ADAPTIVE NETWORK CONTROL," naming as inventors Bijan Treister, Hongbing Gan, and Efstratios Skafidas, the entire disclosures of which are hereby incorporated by reference for all purposes as if fully set forth herein.

This application is related to (1) co-pending U.S. patent application Ser. No. 09/948,499 entitled "APPROACH FOR MANAGING COMMUNICATIONS CHANNELS BASED ON PERFORMANCE," filed on Sep. 6, 2001, naming as inventors Bijan Treister, Hongbing Gan, and Efstratios Skafidas, and (2) co-pending U.S. patent application Ser. No. 09/939,105 entitled "APPROACH FOR TRANSFERRING FUNCTIONS BETWEEN PARTICIPANTS IN A COMMUNICATIONS ARRANGEMENT," filed on Aug. 24, 2001, naming as inventors Bijan Treister, Hongbing Gan, and Efstratios Skafidas.

FIELD OF THE INVENTION

The present invention relates to communications systems, and more particularly, to selecting communications channels and participants with which to communicate based on channel performance and transferring management functions between participants in a communications arrangement.

BACKGROUND OF THE INVENTION

A communications network is any system or mechanism that provides for the exchange of information or data between participants. As used herein, the term "participant" refers to any device or mechanism that exchanges data with other devices or mechanisms over a communications medium. In some communications network arrangements, one of the participants is designated as a "master participant." As used herein, the terms "master participant" and "master" are synonymous. The master participant performs one or more functions that are assigned to only the master participant and not to other participants. For example, a master participant may initiate and manage communications with other participants. As another example, the master participant may select a particular frequency hopping scheme to be used in the communications network.

In communications networks with a master participant, the other participants are conventionally referred to as "slave participants." As used herein, the terms "slave participant" and "slave" are synonymous. Communications networks that use a master participant conventionally use only a single master participant, with any number of slave participants. Master participants are typically elected from available slave participants according to a selection or voting algorithm.

A frequency hopping (FH) protocol is an approach for wireless communications in a communications network that uses a frequency hopping signal transmission technique in which information or data is transmitted over a set of frequencies in a communications frequency band. A frequency hopping communications system is a system that uses a FH protocol. The order in which the communications network hops among the set of frequencies is known as the hopping sequence.

In contrast to FH systems, a non-frequency hopping (NFH) system is simply a communications system whose carrier does not hop over a set of frequencies. A typical NFH system may occupy a portion of the communications frequency band corresponding to several frequencies used by an FH system.

With some communications system approaches, such as the FH approach, the frequency band is broken up into separate frequencies, often referred to as "communications channels." As used herein, the terms "communication channel" and "channel" are synonymous. For example, an FH system transmits data on one channel, hops to another channel in the hopping sequence to transmit more data, and continues by transmitting data on subsequent channels in the hopping sequence. The switching of frequencies may occur many times each second. The use of an FH protocol helps to reduce problems with interference from other communications systems and other interference sources. Frequency hopping also helps with fading of transmissions and power consumption and provides security for the transmission so that others may not intercept the data being transmitted because others do not know the hopping sequence.

An example of a frequency hopping protocol is the Institute of Electrical and Electronics Engineers (IEEE) 802.15.1 Wireless Personal Area Network Standard, which is based on the Bluetooth™ wireless personal area network (WPAN) technology from the Bluetooth Special Interest Group (SIG). The BLUETOOTH trademarks are owned by Bluetooth SIG, Inc., U.S.A. The Bluetooth protocol uses 79 individual randomly chosen frequency channels numbered from 0 to 78 and changes the frequencies 1600 times per second. Examples of NFH systems include the IEEE 802.11b Wireless Local Area Network (WLAN) and the IEEE 802.15.3 next-generation WPAN, both of which operate in the 2.4 GHz Industrial, Scientific, Medical (ISM) band, which is an unlicensed portion of the radio spectrum that may be used in most countries by anyone without a license.

Typically, the master of an FH communications system transmits at even-numbered timeslots on the hopping sequence and the slaves listen at those regular intervals. The master will address one slave (or all slaves in a "broadcast" mode), and the addressed slave responds back to the master at the next odd-numbered timeslot. A preamble, which is known to all the participants of the FH network, is used to identify the network and for the slaves to synchronize with the master. For example, in Bluetooth and IEEE 802.15.1, the known preamble is called the "channel access code."

A common problem for communications systems is poor transmission quality of communications channels, also referred to as poor channel performance, which results in data transmission errors. For example, poor channel performance may increase the bit error rate (BER) or result in the loss of packets, leading to reduced transmission quality. As used herein, a "data packet" is a block of data used for transmissions in a packet-switched system, and the terms "data packet" and "packet" are synonymous.

A common source of poor channel performance is interference from other communications systems or other interference sources. Interference has a dynamic nature due to the use of devices at different times and locations, and as a result, eventually all channels of a communication system that uses multiple channels will experience some degree of interference at some time. Interference may change depending on when the communications systems use the band and the relative locations of the participants of each system to participants of other systems. Because the participants may be mobile, interference may vary depending on the movements of the participants of one system relative to the locations of participants of other systems. In addition, interference may arise from other sources resulting in a degradation of performance.

Another common source of poor channel performance is the coexistence problem that may arise between the communications systems that operate in the same frequency band. For example, while an FH communications system hops over the entire frequency band, an NFH communications system occupies separate parts of the frequency band. When the FH communications system hops over part of the frequency band occupied by an NFH communications system, there may be interference between the systems. Although the use of a FH protocol helps to lessen the interference problem because not all of the FH channels will interfere with other communications systems, there nevertheless remains interference on those channels that coincide with the NFH communications systems. An example of the interference situation is the coexistence problem between the frequency hopping IEEE 802.15.1 WPAN and the non-frequency hopping IEEE 802.11b Wireless Local Area Network (WLAN) because both share the 2.4 GHz ISM band.

One approach for managing poor channel performance is to increase the power used in the transmissions such that interference has less of an impact on the system transmitting at the increased power. However, in mobile applications, this increased power approach drains batteries used by the participants, and thus the required power increase may be impractical. Also, the increased power approach only benefits the system using the increased power and results in a bigger interference impact on other systems.

Other approaches for managing interference include retransmitting data that had errors in an original transmission and incorporating a form of redundancy into the transmission (e.g., by including multiple copies of some or all of the data) so that the participant receiving the data can identify and correct transmission errors. However, such approaches require additional resources to both identify the errors and then to correct the errors, such as by using additional transmissions or by using redundant data transmission approaches that decrease the amount of information that can be transmitted, which reduces the performance of the communications system.

Furthermore, using only a single master participant can have numerous drawbacks. In particular, if for any reason the master participant cannot perform its assigned functions, then the communications network will not function and the participants will not be able to communicate with each other. The master participant may not be able to perform their assigned functions for a variety of reasons. For example, in a wireless communications network with mobile participants, the master participant may move out of range of one or more slave participants, or vice versa. As another example, the master participant's power supply may drop below a minimum threshold or the master participant may otherwise fail. In any of these situations, the slave participants must first recognize that the master participant can no longer perform its assigned functions. Once the slave participants have made this determination, a new master participant must be selected from the available slave participants. Once the new master participant is selected, the functions assigned to the prior master participant must be assigned to the new master participant. Given that a master participant may fail at any time for a variety of reasons, either or both of these tasks may require a significant amount of time and computational resources and cause a significant disruption to the communications network.

Based on the need for wireless communications and the limitations in the conventional approaches, an approach for managing poor performance of communications channels and transferring management functions between participants that does not suffer from the limitations of the prior approaches is highly desirable.

SUMMARY OF THE INVENTION

According to one aspect of the invention, a method is provided for assigning functions between participants and selecting communications channels in a communications arrangement. The method includes assigning, to a first participant from the plurality of participants, one or more functions to be performed by the first participant. The method also includes, prior to a failure of the first participant, designating a second participant from the plurality of participants to perform the one or more functions if any of one or more handoff criteria are satisfied. The method further includes, in response to any of the one or more handoff criteria being satisfied, assigning the one or more functions to the second participant. The method further includes selecting, based upon the performance of a set of communications channels and at least one performance criterion, a communication channel from a plurality of communications channels. The method also includes generating channel identification data that identifies the selected communications channel and providing the channel identification data to a third participant of the plurality of participants. The method further includes receiving a communication from the third participant over another communications channel from the plurality of communications channel, where the other communications channel is selected based on the channel identification data.

According to another aspect of the invention, a method is provided for selecting participants with which to communicate and assigning functions between participants in a communications system. The method includes determining the performance of a communications channel between a first participant and a one or more other participants. The method also includes selecting, based upon the performance of the communications channel, a second participant from the one or more other participants. The method further includes assigning, to a third participant, one or more functions to be performed by the third participant. The method also includes designating a fourth participant to perform the one or more functions if any of one or more handoff criteria are satisfied.

According to another aspect of the invention, a communications device is provided that comprises an interface and a mechanism. The interface is configured to receive data from a plurality of communications devices and to transmit data to other communications devices. The mechanism is configured to perform one or more functions, and prior to a failure of the communications device, designate a particular communications device from the plurality of communications devices to perform the one or more functions if any of a set of handover criteria are satisfied. The mechanism is further configured to select, based upon the performance of a plurality of communications channels, a first communications channel, generate channel identification data that identifies the first communications channel, and provide the channel identification data to another communications device. The mechanism is also configured to receive a communication from the other communications device over another communications channel that is determined based on the channel identification data.

According to other aspects, the invention encompasses a computer-readable medium and a carrier wave configured to carry out the foregoing functions.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 1D is a flow diagram that depicts an approach for selecting communications channels based on channel performance and transferring management functions between participants, according to an embodiment of the invention;

FIG. 2A is a block diagram that depicts a performance lookup table that includes performance data, according to one embodiment of the invention;

FIG. 2B is a block diagram that depicts a classification lookup table that includes channel classification data, according to one embodiment of the invention;

FIG. 4 is a flow diagram that depicts an approach for initializing a communications arrangement having a master participant, according to an embodiment of the invention;

DETAILED DESCRIPTION OF THE INVENTION

Figure 1A:
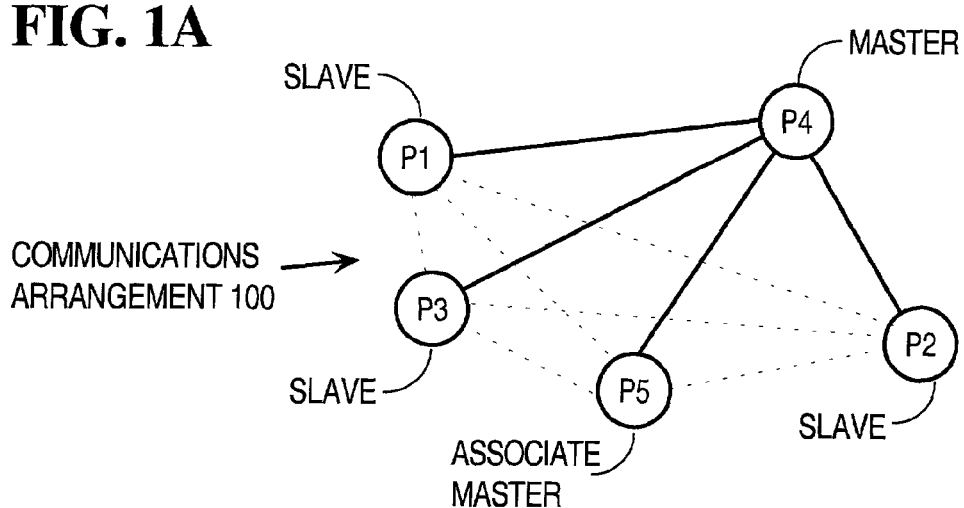
FIG. 1A is a block diagram that depicts a communications arrangement that includes several participants, according to an embodiment of the invention.

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

In the following description, various embodiments of the invention are described in the following sections:

I. Overview
  A. Example Communications Arrangement
  B. Selecting Channels Based on Performance
  C. Transferring Functions Between Participants
  D. Additional Examples for Selecting Channels
  E. Selecting Participants Based on Performance
  F. Managing Channel Performance Data
II. Measuring Channel Performance, Classifying Channels, and Storing Related Information
  A. Approaches for Channel Performance Measurement
  B. Approaches for Channel Classification
  C. Maintaining Channel Performance and Channel Classification Information
III. Selecting Channels and Informing Participants
IV. Network and Participant Initialization V. Master Connection Sequence
  A. Normal Packet
  B. Request Handover Packet
  C. Request Table Data Packet
  D. Request Associate Master Packet
VI. Associate Master Assuming Role as Master
VII. Slave and Associate Master Connection Sequence
  A. Initial Handling of Packets
  B. Packet Not Intended for Slave
  C. Normal Packet
  D. Update Table Packet
  E. Handover Request Packet
  F. Promotion Request Packet
VIII. Redemption of Channels
IX. Approach for Master Adaptive Selection of Participants
X. Implementation Mechanisms I. Overview A novel approach for managing communications channels generally involves transferring management functions between participants and measuring, maintaining, and using channel performance data to manage a communications system. The transferring of management functions between participants generally involves the use of an associate master participant that assumes responsibilities for functions assigned to the master participant if the master participant can no longer perform the functions. The approach may be used with any type of functions and the invention is not limited to any particular type of functions. Channel performance data may be used to select one communications channel from a group of communications channels for use in communicating with a participant of the communications system. Also, the channel performance data may be used to select one participant from a group of participants to communicate with over a specified communications channel. The participants of the communications system maintain and share performance data about the communications channels between the participants. The approach allows the communications system to adaptively avoid channels with poor performance and reduces the amount of time required both to determine that the master participant can no longer perform the functions and to assign responsibility for performing the functions to another participant once that determination is made.

A. Example Communications Arrangement

FIG. 1A is a block diagram that depicts a communications arrangement 100 that includes participants P1 through P5, according to an embodiment of the invention. In the example depicted in FIG. 1A, participant P4 is designated as the master participant and is responsible for performing one or more functions. An example function is initiating and managing communications with participants P2, P3, P3, and P5. Master participant P4 may be elected from participants P1–P5 by participants P1–P5 or another entity and the invention is not limited to any particular approach for designating one of the participants as the master participant.

Participants P1 through P5 may be any of a variety of communications devices. Examples of communications devices that may be used in a communications arrangement that uses the channel selection approach described herein include, but are not limited to, wireless devices that are used in wireless local area networks (WLANs) and in wireless personal area networks (WPANs), such as cordless phones, laptop computers, desktop computers, printers, and personal digital assistants (PDAs). Wireless devices may communicate in a variety of ways, including but not limited to, infrared, line of sight, cellular, microwave, satellite, packet radio and spread spectrum technologies. Some communications devices may be characterized as mobile devices based on the relative ease of moving such devices between locations or because the mobile devices may be conveniently carried by a person, such as cordless phones, laptop computers, and PDAs.

The solid lines connecting master P4 to slaves P1, P2, and P3 and associate master P5 depict the logical connections between the respective participants over which data is communicated between master P4 and a particular participant from slaves P1, P2, and P3 and associate master P5. In addition, when master P4 communicates with a particular participant, the other participants may listen to the communication from master P4 to the particular participant over the logical connections depicted by the solid lines. The dotted lines connecting slaves P1, P2, and P3 and associate master P5 to each other depict the logical connections between the respective participants over which the participants may listen to replies from the other participants to master P4. In some communications system, the slaves and associate master do not communicate with each other but may listen to communications from other participants. In other communications systems, slave and the associate master may communicate directly with each other. The invention is not limited to a particular configuration of which participants may communicate together or which participants may listen to communications from one another.

B. Selecting Channels Based on Performance

FIG. 1D is a flow diagram 110 that depicts an approach for selecting communications channels based on channel performance and transferring management functions between participants, according to an embodiment of the invention. Although the flow diagrams described herein provide a particular set of steps in a particular order, other implementations may use more or fewer steps and a different order than those shown in the figures discussed herein.

In the example depicted by FIG. 1D, a communications channel is selected for use by a participant of a communications arrangement, the participant is told which communications channel to use, and the participant communicates using the selected communications channel. However, in other examples, the participant may be told to not use the selected communications channel, which may be appropriate if the selected communications channel has poor performance. Also, the participant may be told to skip the selected communications channel and use the next communications channel of a specified sequence of communications channels.

In block 112, the performance of the communications channels of the communication system is determined. For example, for a communications system that uses 90 channels, some or all of the 90 channels may be tested to determine channel performance. The determination of the performance of the communications channels may be performed by a different entity or device than the entity or device that performs the functions described in FIG. 1D. In general, the different functions described herein may be performed by different entities or devices.

In block 114, a communications channel is selected based on the performance of the communications channels determined in block 112. One or more performance criteria and one or more selection criteria may be used with the performance information to select the communications channel. For example, a communications system may experience interference on channels 3 through 5 from one communications system and on channels 50 through 54 from another communications system, and the channel testing may indicate a high bit error rate (BER) on those channels.

Channels may be classified by comparing the test results to the performance criteria. For example, the performance criteria may be a specified value, or a specified threshold, that is used to determine whether the channel performance is acceptable or not. As a particular example, if the BER for a channel satisfies (e.g., exceeds) the specified threshold, the channel is classified as "good," whereas a channel with a BER that does not satisfy the specified threshold is classified as "bad." Other classification approaches may be used, and the invention is not limited to a particular classification approach.

The reason why a bad channel's performance does satisfy the specified threshold may be due to a variety of reasons, including but not limited to, the channel being used by another communications system or noise from other interference sources. For example, in a Bluetooth communications system, microwave ovens are a common source of interference.

After classifying the performance of the channels, a communications channel is selected based on the selection criteria. For example, the selection criteria may be to select a good channel but not a bad channel. By using good communications channels, a communications system may avoid interference present on bad channels. Other selection criteria may be chosen to select the channel that provides the best performance among the available channels. Yet other selection criteria may be chosen to randomly select a channel from among the good channels.

Although this example describes the use of a particular type of performance criteria to classify channels and particular selection criteria to select from the classified channels, other approaches may be used to select channels. For example, channels may be selected based on comparing performance results to one or more criteria without first classifying the channels. Also, other criteria may be used, for example, that particular channels are to be selected regardless of the test results because the particular channels are uniformly distributed over the communications band. As another example, a selection criterion may be that particular channels are not to be selected regardless of the test results. Such channels may be previously identified as having a large amount of interference from particular sources, such as another communications system that operates frequently but irregularly. As a result the other system may not be detected during testing and the channels may be selected, although at times there may be significant interference on those channels. Therefore, the selection criteria may specify a list of channels that are not to be selected, even if the channels on the list have satisfactory performance during testing.

In block 116, channel identification data that identifies the communications channel selected in block 114 is generated and provided to a participant of the communications system. For example, in a Bluetooth or IEEE 802.15.1 FH communications system, the master may provide a slave with data that identifies the communications channel that is selected in block 114. The channel data may be appended to a normal, or standard, data packet sent from the master to the slave. Alternatively the channel data may be incorporated into a special packet, such as by including the channel data in the packet header or payload. The master may send the packet to the slave over a communications channel that is determined according to the frequency hopping sequence.

In block 118, a communication is received from the participant over the communications channel that is selected in block 114. For example, in a FH communications system, the communication is a packet that is sent from the slave to the master over the selected communication channel in response to the packet sent from the master to the slave in block 116.

C. Transferring Functions Between Participants

Continuing with reference to FIG. 1D, in block 120, a master participant is selected. The selection of the master may be performed by a variety of methods, including those discussed above with respect to FIG. 1A.

In block 122, an associate master participant is selected prior to the failure of the master participant. For example, referring to communications arrangement 100 of FIG. 1A, participant P5 is designated as an associate master participant by master participant P4, slave participants P1–P3, or another mechanism or process. Associate master participant P5 may perform all of the functions of slave participants P1–P3 prior to associate master participant P5 being promoted to the role of master participant, as discussed below.

Figure 1B:
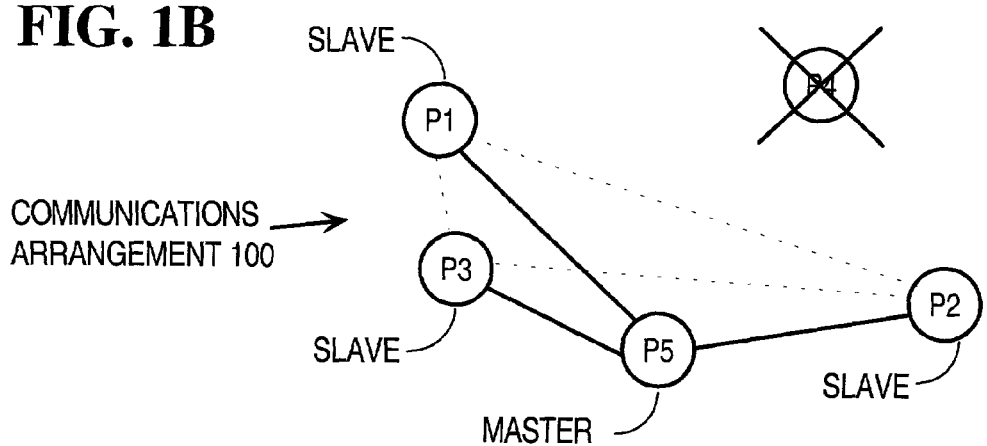
FIG. 1B is a block diagram that depicts a communications arrangement in which an associate master participant assumes the role of master participant, according to an embodiment of the invention.

In block 124, if the designated handoff criteria are satisfied, the associate master participant assumes the role of the master participant. For example, as depicted in FIG. 1B, associate master participant P5 assumes the role of master participant, i.e., performs the functions previously assigned to master participant P4, if any of a set of handoff criteria are satisfied. The particular handoff criteria used may vary depending upon the requirements of a particular application and the invention is not limited to any particular handoff criteria.

One example handoff criteria is a request from the current master participant. Master participant P4 may know that it can no longer perform the assigned functions and requests associate master participant P5 to assume the role of the master participant. For example, master participant P4 may be a mobile device whose available power has fallen below a specified threshold. Alternatively, master participant P4 may know that it is moving out of range of one or more of the other participants or is experiencing a poor communications link between itself and one or more of the other participants.

Another example handoff criteria is a failure of master participant P4. Associate master participant P5 may be notified by other participants or another process or mechanism that master participant P4 has failed. Alternatively, associate master participant P5 may itself detect that master participant P4 has failed and assume responsibility for performing the functions. According to one embodiment of the invention, associate master participant P5 monitors data transmitted by master participant P4 and if master participant P4 has not made any communications within a specified period of time, then associate master participant P5 assumes that master participant P4 can no longer perform the functions of master participant, i.e., has failed, and associate master participant P5 assumes the role of master participant. Additional details of the functions and role of associate master participants are described in more detail hereinafter.

Figure 1C:
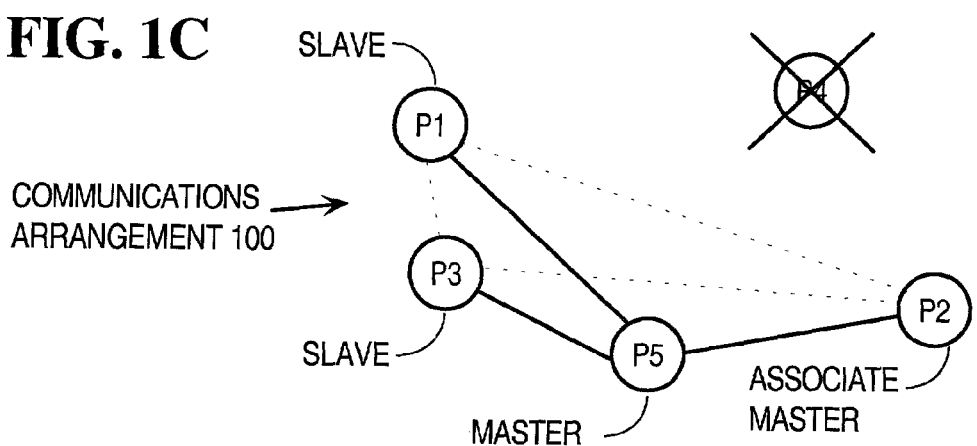
FIG. 1C is a block diagram that depicts a communications arrangement in which a slave participant is designated as the new associate master participant, according to an embodiment of the invention.

According to an embodiment of the invention, after the associate master participant assumes the role of the master participant, a new associate master participant is selected. For example, referring to FIGS. 1A and 1B, after associate master participant P5 assumes the role of master participant, a new associate master participant may be designated by the new master participant P5, the remaining slave participants P1-P3, or some other mechanism or process. As depicted in FIG. 1C, participant P2 is designated as the new associate master participant.

D. Additional Examples for Selecting Channels

According to one embodiment of the invention, the communication from the participant includes a measurement of the performance of the channel used in sending the packet in block 116. For example, in a FH communications system, the packet from the master to the slave may be used by the slave to measure the performance of the channel used to send the packet to the slave. The performance measurement may be incorporated into the reply packet from the slave to the master. The performance measurement may be stored by the slave, as discussed below.

According to another embodiment of the invention, the communication from the participant is used to generate a measure of the performance of the channel used in sending the communication. For example, in a FH communications system, the packet from a slave to the master may be used by the master to measure the performance of the channel used to send the reply packet to the master, and the performance measurement may be stored by the master, as discussed below.

In the example depicted by FIG. 1D, the selected communications channel is used by the slave to respond to the master. By using channels that are selected based on having acceptable performance, the communications system avoids channels with unacceptable performance. However, the opposite approach may be used to select channels with unacceptable performance and inform participants of the communication system not to use such channels. According to another embodiment of the invention, the communications system may be configured to not use the selected communications channel for transmitting the communication from the participant. For example, the communications channel may be selected because the channel has performance that falls below the specified threshold. Informing the participant that the poor performing channel is not to be used helps to avoid the loss of packets over the selected channel.

Other approaches for using a selected channel may be used. According to yet another embodiment of the invention, the communications system may be configured to skip the selected communications channel and use the next channel in a specified sequence of channels, such as a frequency hopping sequence. Other implementations may combine two or more of the above approaches for using the channel identification data to determine which channel the participant should use. Further, the communications system may be configured to inform a participant of both the selected communications channel and indicate how the selected communications channel is to be used. For example, the channel data may include information indicating whether the selected channel is to be used, not used, or skipped.

A selected communications channel may be provided to more than one participant in a communications system, and the selected communications channel may be used by the participant for more than one communication. However, the use of a set or group of selected communications channels is typically preferred over the repeated use of a single selected communications channel, such as the best performing channel. For example, the repeated use of the same selected communications channel by multiple participants or by a particular participant for multiple communications may not be desirable due to changes over time in the performance of the selected channel. Also, the repeated use of a channel may be inconsistent with the basic approach of many communications system to use different communications channels.

According to another embodiment of the invention, prior to each communication with another participant, the channel selection process is repeated, such that a different channel is typically selected for each communication. For example, prior to communicating to a particular participant, a master may select a communications channel based on the approach illustrated in FIG. 1D. Then prior to the master's next communication, which may be to the same participant or a different participant, the master repeats the channel selection process. Different channels may be selected because the channels differ in performance between the master and the different participants, because the transient nature of interference has changed the performance of the channels, or because the master randomly selects a particular channel from among the channels having acceptable performance. As a result, the master may choose a different communications channel than that chosen for the previous communication. In general, different packets from the master to the participants identify different communications channels in the communications system.

According to other aspects of the invention, the master does not include channel data in every packet sent to each participant. For example, some slaves or associate masters may not support the channel selection approach described herein. Further, the master may not always select a different channel for each participant to use in responding to the master. For example, the communication system may use a specified set of channels, and therefore some channels will be selected more than once.

The determination of channel performance depicted by block 112 may be repeated or updated. For example, channel performance testing may be performed according to a specified schedule, such as the expiration of specified time period, or as a result of monitoring and detecting new interference among the selected set of channels, such as from another communications system that previously did not cause interference. As another example, normal communications between the participants of the communications system may be monitored to determine channel performance.

As a result, the method depicted in FIG. 1D may be used by a communications system to avoid poor quality channels in a quasi-adaptive manner by selecting communications channels with acceptable quality. By using this novel approach to quasi-adaptively select communications channels based on channel performance, interference problems are reduced and transmission performance is improved for both the communications system that selects the communications channels to use and other interfering communications systems. Also, by reducing interference, the power level required to achieve a specified transmission quality is decreased, thereby increasing battery life of mobile devices.

The approach described herein may be characterized as "robust" because interference in a communications system is reduced or eliminated by using channels that have been tested and determined to be "good" because channel performance satisfies a specified threshold. In contrast, channels that have been tested and determined to be "bad" have channel performance that does not satisfy the specified threshold. The approach described herein is a simple scheme that is easy to implement on many devices due to the low computational and memory requirements and is fully interoperable with devices that do not support this novel approach.

E. Selecting Participants Based on Performance

Figure 1E:
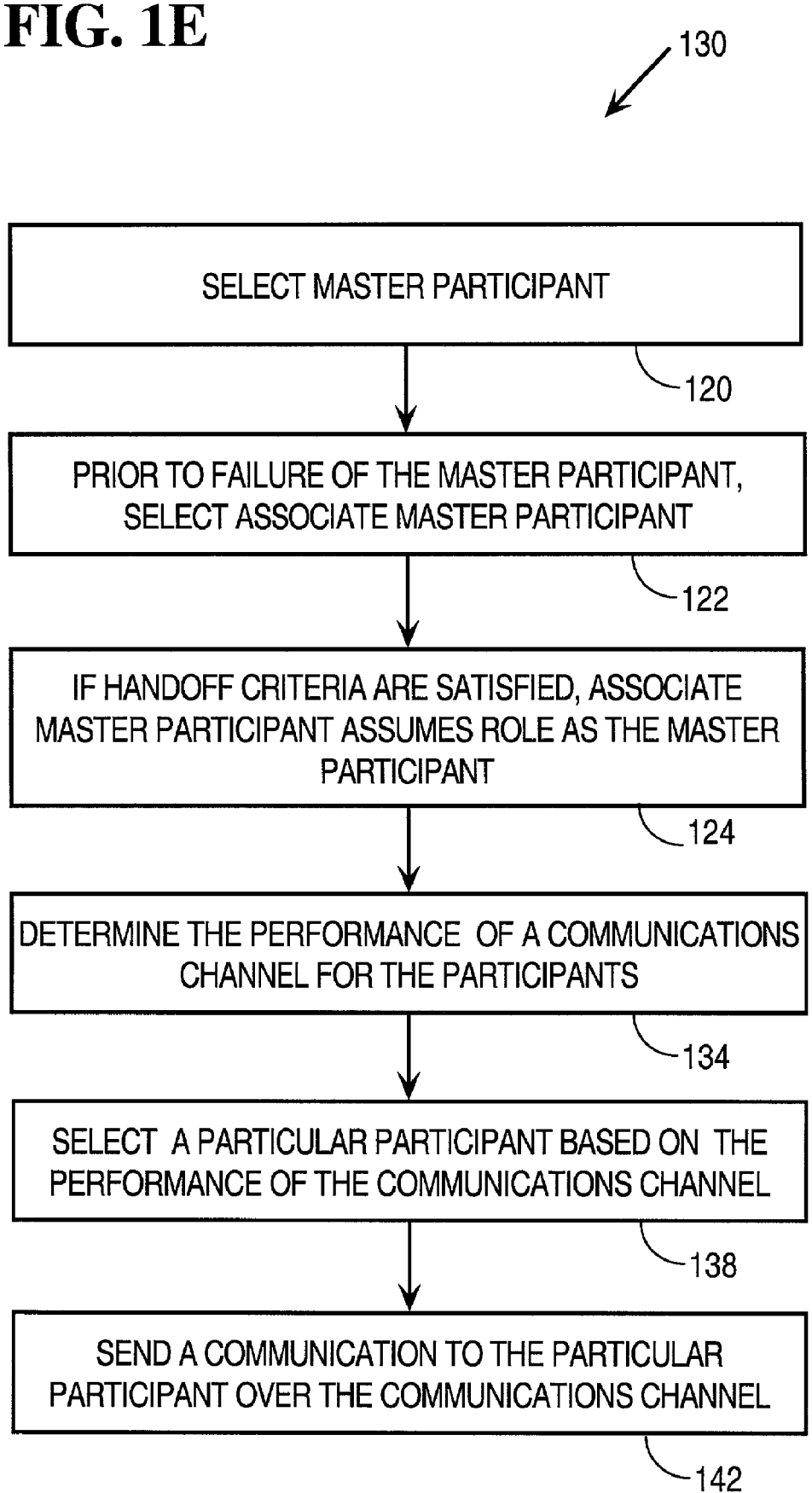
FIG. 1E is a flow diagram that depicts an approach for selecting participants based on channel performance, according to an embodiment of the invention.

FIG. 1E is a flow diagram 130 that depicts an approach for selecting participants with whom to communicate based on channel performance, according to an embodiment of the invention. Blocks 120, 122, and 124 are the same as in FIG. 1D, as described above.

In block 134, the performance of a communications channel between one participant and one or more of the other participants of the communication system is determined. For example, in a FH communications system, the performance of a particular channel between a master and two or more slaves may be measured.

In block 138, a particular participant of the one or more other participants is selected based on the performance of the communications channel determined in block 134. For example, in a FH communications system, the master may communicate with a set of two or more participants. The particular communication channel over which the master will communicate with each participant is based on the frequency hopping sequence, and therefore the master is not free to select the communications channel to be used. However, the master may choose which participant of the set of participants to communicate with over the particular channel based on the performance of that channel between the master and the different participants.

One or more performance criteria and one or more selection criteria may be used with the performance information to select the participant. For example, in FIG. 1A, communications arrangement 100 may experience interference on channel 17 between master P4 and slaves P1 and P3, but channel 17 may not have an interference problem between master P4 and slave P2 and between master P4 and associate master P5. The performance of channel 17 may be different for some participants because interference sources are closer to some slaves than others.

Channels may be classified by comparing the test results to the performance criteria. For example, the performance criteria may be a specified value, or a specified threshold. As a result of the performance testing, channel 17 may be classified as "bad" between master P4 and slaves P1 and P3 and as "good" between master P4 and slave P2 and associate master P5.

After classifying the performance of the channels, a communications channel is selected based on the selection criteria. For example, the selection criteria may be to select a particular participant for whom the particular channel is a good channel instead of a participant for whom the particular channel is a bad channel. Thus, by selecting a particular participant for whom the communications channel is good, the communications system performing the channel selection may avoid using bad channels resulting in increased throughput for the communications system by minimizing transmission errors and lost packets.

Although this example describes the use of a particular type of performance criteria to classify channels and particular type of selection criteria to select particular participants with whom to communicate, other approaches may be used to select a set of channels. For example, participants may be selected based on comparing performance results to one or more criteria without first classifying the channels. Also, other criteria may be used, such as that particular participants are, or are not, to be selected regardless of the test results, or that the participant with the best performance for the particular channel is to be selected.

In block 142, a communication is sent to the particular participant over the communications channel. For example, in the example above, master P4 may select to send a communication over channel 17 to associate master P5 because channel 17 is classified as a good channel between master P4 and associate master P5. Master P4 could have selected slave P2 because channel 17 is also classified as a good channel between master P4 and slave P2. However, master P4 would not select slaves P1 or P3 because channel 17 is classified as a bad channel between master P4 and slaves P1 and P3.

F. Managing Channel Performance Data

Figure 1F:
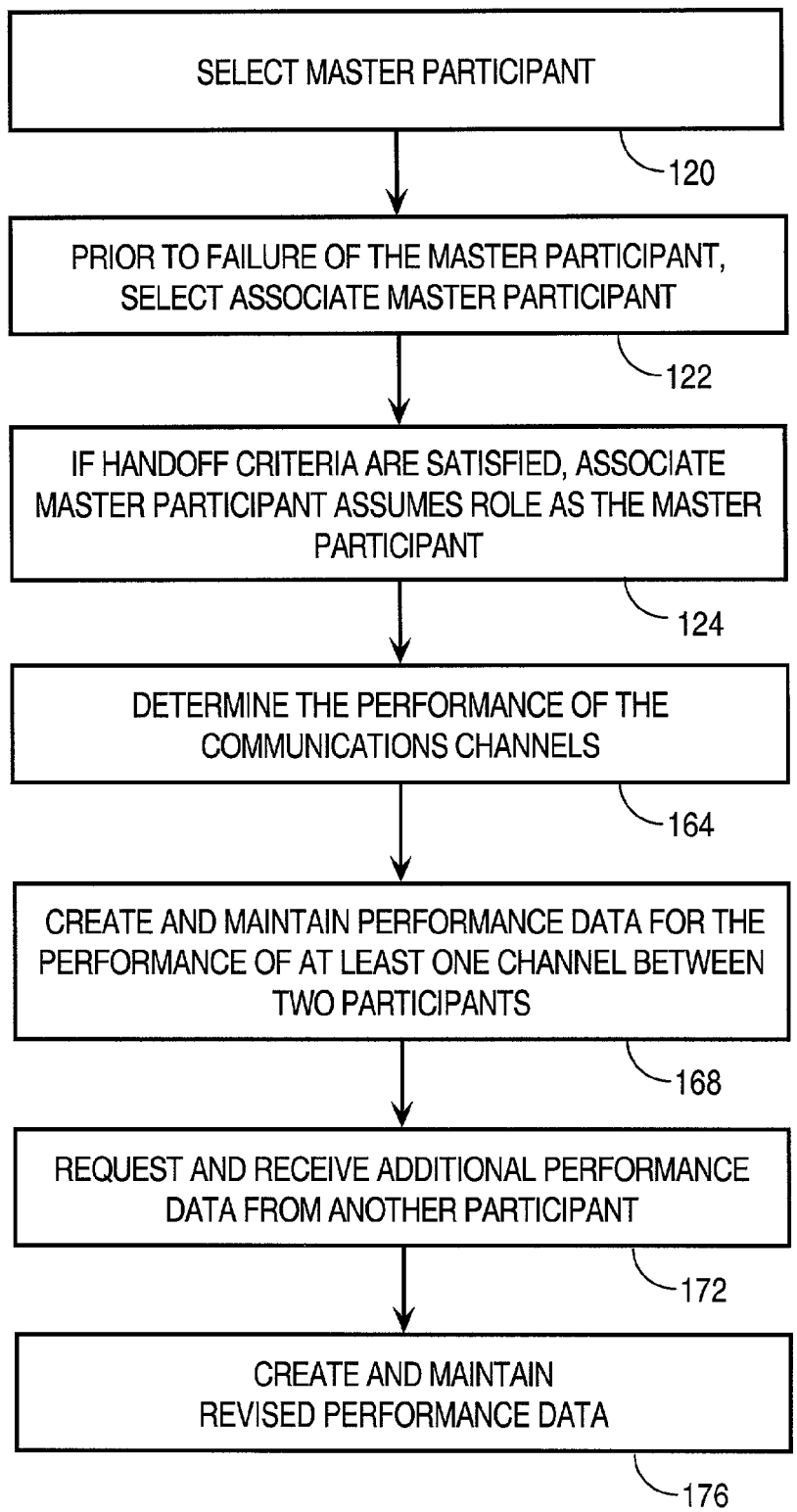
FIG. 1F is a flow diagram that depicts an approach for managing performance data for communications channels between participants of a communications system, according to an embodiment of the invention.

FIG. 1F is a flow diagram 160 that depicts an approach for managing performance data for communications channels between participants of a communications system, according to an embodiment of the invention. Blocks 120, 122, and 124 are the same as in FIG. 1E, as described above.

In block 164, the performance of the communications channels is determined. For example, for a communications system that uses 50 channels, some or all of the 50 channels may be tested to determine channel performance.

In block 168, performance data is created and maintained for the performance of at least one channel between two participants. For example, in a FH communications system, the master may create and maintain performance data for the set of communications channels used by the FH communication system for communications between the master and the slaves. As a more specific example, the master may store the performance data in a lookup table that includes data for some or all of the communications channels between the master and some or all of the slaves of the communications system. The master's lookup table may also include data for other participants, such as an associate master.

In block 172, additional performance data is requested and received from another participant. For example, a particular slave may create and maintain performance data for the set of communications channels used by the FH communication system for both the communications between the slave and the master and the communications between the slave and other slaves or the associate master. The master may send a request to the particular slave for the particular slave's performance data. As a more specific example, the particular slave may store the performance data in a lookup table that includes data for some or all of the communications channels between the particular slave and the master, and some or all of the other slaves of the communications system. In response to the request from the master, the particular slave provides the master with some or all of the performance data maintained by the particular slave.

In block 176, revised performance data is created and maintained. For example, the master may combine the performance data received from the particular slave in block 172 with the performance data determined by the master in block 164. Such combined data may reflect the transmission performance from the master to the slaves and associate master, from the slaves and associate master to the master, and between the slaves and associate master. As another example, the master may maintain the requested performance data from the slave separately from the performance data determined in block 164.

In other embodiments, performance data is updated based on performance measurements of normal packets used by the participants of the network. For example, as discussed above, communications from participants may include a measurement of the performance of the communications channel used in sending a previous communication to the participant, and the communications from participants may be used to measure performance of communications channels used by the participants to send the communications. Such performance measurements may be used to revise or update performance data, such as by a master that maintains a lookup table of performance data for the communications channels between the master and the slaves of the communications system.

II. Measuring Channel Performance, Classifying Channels, and Storing Related Information According to one embodiment of the invention, channel performance is determined using one or more channel performance measurement techniques. For example, any of the techniques for measuring channel performance that are discussed below may be used alone or in combination. Although testing is normally performed on all available communications channels, it is not necessary to test all channels, nor is it necessary to use the same method for testing performance of different channels.

According to other aspects of the invention, channel performance may be determined at an initial time for some or all of the channels, or the channel performance may be initially set at a specified initial value. Channel performance may be retested for some or all of the channels of the communications system, such as at periodic intervals or when a particular condition occurs, such as the detection of new interference. In addition, channel performance may be monitored during normal operation, and the results of the monitoring used to update or replace earlier channel performance determinations. Further, channel performance may be represented by quantitative indications, including but not limited to, scores or other values, and/or by qualitative indications, including but not limited to, low, medium, and high, pass and fail, and whether a packet is lost or not.

According to yet other aspects of the invention, channel performance may be determined both by participants that are the intended recipient of a packet and by participants that "listen" to packets being sent to other participants. For example, in a FH communications system, a master may send a packet to a particular slave, and the particular slave may measure the performance of the channel used by the master to send the packet. However, the other slaves and the associate master in the communications system may also receive the transmission from the master to the particular slave, even if the transmission was only intended for the particular slave, because the other slaves and the associate master are listening to the master at the same time. Each slave and the associate master determines whether it is the intended recipient of the packet, such as by examining the address information in the header of the packet.

Participants that receive packets intended for another participant may be described as having "listened" to the transmission from the master to the particular slave that is the intended recipient. Only the particular slave or associate master for whom the packet is intended is described as being the "recipient" of the packet. Similarly, when a recipient sends a reply to a master, other slaves and the associate master in the communication system may listen for the transmission, and based on the packet received, determine a measurement of channel performance for the channel used to send the reply.

As a result, a particular slave may measure the performance of channels between the particular slave and the master based on both packets sent by the master to the particular slave and packets sent by the master to other participants. The particular slave may measure the performance of channels between the particular slave and other participants based on packets that the particular slave listens to and that are sent by the other participants to the master. Further, the master may measure the performance of channels between the master and each slave and the associate master based on packets sent by the slaves and associate master to the master. Finally, as explained below, the participants of the network may request and receive performance measurements from other participants.

A. Approaches for Channel Performance Measurement

According to one embodiment of the invention, redundancy can be included in the structure of the packets used in the communications system and then used to determine channel performance. For example, a specified pseudo-random sequence may be appended to the header of some or all of the packets used for communications in the system. Because the participants in the communications system know the pseudo-random sequence, the participants can determine the bit error rate (BER) score, or value, based on detected errors in the pseudo-random sequence. By using a common technique, such as the pseudo-random number sequence and determining the BER, the same performance measurement may be used for some or all of the channels of the communications system, which may help to simplify the tracking and combining of performance data.

According to other aspects of the invention, other sequences besides a pseudo-random sequence may be used, including but not limited to, a random sequence, a specified sequence, or any other data that is known to the participants of the communications system. This allows the participants to determine if errors occur in the data and in some situations, the extent or number of errors.

According to another embodiment of the invention, a received signal strength indicator (RSSI) is used to test the performance of communications channels. One approach for determining the RSSI for a channel is to have a master send a NULL packet to a participant. A NULL packet generally includes only an access code and a packet header. NULL packets are often used to ensure that a slave is still synchronized to the communications network.

When a participant receives a NULL packet, the participant does not send a return packet to the master. By listening to the return channel from the synchronized participant, the signal received by the master represents the noise floor of the channel since the participant is not transmitting on the channel. If there is interference, such as from another communications system, the RSSI will be high. Conversely, if there is no interference, the RSSI will be low. According to another aspect of the invention, channel performance is measured on a scale from very low RSSI values to very high RSSI values corresponding to the noise level measured on the channel, thereby providing a range of channel performance measurements.

According to another embodiment of the invention, the known preamble at the start of the packet is used to test the performance of communications channels. For example, identification packets, NULL packets, POLL packets, or any other kind of packet may be used to correlate the received preamble against the known preamble. A packet that does not pass the correlation is discarded (e.g., it is a lost packet). Also, the errors that occur may be used to determine a BER score/value.

According to another embodiment of the invention, a header error check (HEC) is used to test the performance of communications channels. The HEC is a check on the contents of the packet header, such that if an error occurs in the packet header, the packet does not pass the check and the packet is discarded (e.g., it is a lost packet).

According to another embodiment of the invention, a cyclic redundancy check (CRC) is used to test the performance of communications channels. The CRC may be a check of either the payload of the packet or the complete contents of the packet, depending on the communications system protocol being used. As an example, in Bluetooth and IEEE 802.15.1, the data packet must pass a CRC check, otherwise the packet must be retransmitted. A retransmission request (RR) indicates poor channel performance.

According to another embodiment of the invention, forward error correction (FEC) is used for channel performance testing of transmissions between participants of a communications system. FEC may be used on either a packet header or on the payload of the packet. FEC is used as a form of redundant data encoding to allow the recipient to ensure the integrity of the received data and to correct any identified errors. As an example, in Bluetooth or IEEE 802.15.1, the packet header is 1/3 FEC coded, and the payload is 2/3 FEC coded. FEC coding may be used for both an NEB calculation and for error correction.

The descriptions of each channel performance measurement technique above describe the use of the same method for all transmissions, such as master to slave and slave to master transmissions. However, different methods may be used for each direction of transmission, and different methods may be used for different transmissions in the same direction. For example, the RSSI approach may be used for master to slave transmissions while the preamble correlation is used for slave to master transmissions. In addition, different methods may be combined, such that to have a test considered successful, two or more tests must provide an acceptable result. For example, to receive a "pass" indication, a packet may have to pass both the preamble correlation and the HEC tests. Furthermore, the tests used may change over time depending upon the effectiveness of the tests and the requirements of a particular application or implementation. Finally, other approaches that provide an indication of channel performance besides those described herein may be used.

B. Approaches for Channel Classification

According to one embodiment of the invention, a channel is classified based on the measured channel performance and one or more classification criteria. For example, a channel may be classified as "good" or "bad" based on the results of the channel performance testing by applying one or more performance measurements to specified performance criteria as discussed above. As used herein, a good channel's performance satisfies a specified criterion, or a specified threshold, whereas a bad channel's performance does not satisfy the specified criterion or threshold. Although this discussion assumes that all available channels, or all channels that could be used by the communications system, are tested and classified, particular implementations may test and classify fewer than all of the channels. Also, multiple tests for channels may be made and combined, such as by averaging results, to determine a particular performance measurement.

According to another embodiment of the invention, different types of test results may be used and combined. For example, tests that provide NEB results, either numerical or converted to a qualitative scale, may be combined with CRC results of "pass/loss" to arrive at an overall assessment of channel performance. The manner in which such results are combined depends on the particular implementation, and the invention is not limited to any particular approach. For example, different types of test results may be converted to a single type of scale and then combined or averaged to reach a final result. As another example, different test results may be combined using weighting factors that favor some types of tests over others to arrive at a final result.

The conversion of numerical results to qualitative results and the combining of individual tests results to achieve a classification of each channel depends on how competing tradeoffs are to be weighed for a given implementation. For example, high channel performance may be desired, but setting a standard that is too high (e.g., all test results must be "high") may limit the number of channels classified as "good," resulting in few good channels available for use. This in turn may necessitate frequent retesting of the channels when supposedly poor performance is detected. Conversely, setting a standard that is too low allows for a larger pool of channels to be used, but then channels with significant interference are classified as good when in fact channel performance is low and channels are not retested when new interference occurs.

According to another embodiment of the invention, the results of channel performance testing are compared to one or more acceptance criteria. For example, if the testing provides NEB results, an average value may be determined and compared to an acceptance criterion, such as a threshold value. If the testing results exceed the threshold, the channel is classified as "bad", but if the testing results do not exceed the threshold, the channel is classified as "good." As another example, the correlation approach, HEC, and CRC may all be used to determine whether a packet is lost or not (e.g., whether an error occurs as a result of the transmission of the packet) and the packet loss ratio determined and compare to a threshold value. For example, assuming that a threshold of 20% is established, the loss of more than 10 packets out of 50 on a particular channel would result in the channel being classified as bad, whereas losing 10 or fewer packets on a particular channel would result in the channel being classified as good.

C. Maintaining Channel Performance and Channel Classification Information

According to one embodiment of the invention, channel performance information is maintained by one or more participants of the communications system. For example, in a FH communications system, a master may maintain channel performance data for each channel and for each slave in the system. However, other implementations and communications systems may maintain data on fewer than all of the available channels and for fewer than all of the other participants in the system, and other participants besides a master participant may maintain performance data.

FIG. 2A is a block diagram that depicts a performance lookup table 200 that includes channel performance data, according to one embodiment of the invention. The example performance lookup table depicted in FIG. 2A includes a row for slaves A, B, C, . . . , nn and column for channels 1, 2, 3, 4, . . . , n, although any number of slaves and channels may be included, along with an associate master or other types of participants. Different organizations of the information may be used besides that depicted in FIG. 2A. In addition, one row in the lookup table of the master may be for the selected associate master, and one row in the lookup table of the associate master may be for the master. The performance data included in performance lookup table 200 is in the form of quantitative measurements that are on a scale of 0 to 10 with 0 being the lowest score (i.e., relatively poor channel performance) and 10 the highest score (i.e., relatively good channel performance). However, other scales for quantitative measurements may be used as well as qualitative measurements.

Data in a performance lookup table may be missing for a particular channel or slave. For example, performance lookup table 200 does not include data for slave B or for channel 3. Measurements for a particular slave or a particular channel may not be included for a variety of reasons. For example, a particular slave may be omitted or not have any data because the slave does not support the channel selection or participant selection approaches described herein. As another example, a particular channel may be omitted or not have any data because the particular channel was determined to be bad at the initialization of the communication system and therefore is not used by the system. As yet another example, in a FH communications system, the frequency hopping sequence may use fewer than all of potential channels that are potentially available, and the selected frequency hopping sequence may not include the particular channel, such as when the particular channel is not needed or when the particular channel is determined to have unacceptable performance.

According to another embodiment of the invention, one or more participants of a communications system may maintain a performance lookup table that may include data for some or all of the channels between the participant and some or all of the other participants of the communications system. For example, in a FH communications system, the master and associate master typically each maintain a performance lookup table, and some or all of the slaves may also maintain performance lookup tables.

According to one embodiment of the invention, channel classification information is maintained by one or more participants of the communications system. For example, in a FH communications system, a master may maintain channel classification data for each channel and for each slave in the system. The master may maintain the data by storing data locally or at a separate location. Similarly, the associate master may maintain channel classification data for each channel and for each slave and the master in the system. However, other implementations and communications systems may maintain data on fewer than all of the available channels and for fewer than all of the other participants in the system, and other participants besides a master participant and an associate master participant may store classification data.

FIG. 2B is a block diagram that depicts a classification lookup table 250 that includes channel classification data, according to one embodiment of the invention. The example performance lookup table depicted in FIG. 2B includes a row for slaves A, B, C, . . . , nn and column for channels 1, 2, 3, 4, . . . , n, although any number of slaves and channels may be included, along with an associate master or other types of participants. Different organizations of the information may be used besides that depicted in FIG. 2B. The classification data given in performance lookup table 200 is in the form of a usability classification approach in which a useable channel is identified by "YES" and an unusable channel is identified by "NO." Other classification approaches may be used, such as classifying channels as good or bad or as useable and unusable, and the invention is not limited to a particular classification approach.

Data in a classification lookup table may be missing for a particular channel or slave. For example, classification lookup table 250 does not include data for slave B or for channel 3. Measurements for a particular slave or a particular channel may not be included for a variety of reasons, including those described above with reference to channel performance data and performance lookup table 200 of FIG. 2A.

According to another embodiment of the invention, one or more participants of a communications system may maintain a classification lookup table that may include data for some or all of the channels between the participant and some or all of the other participants of the communications system. For example, in a FH communications system, the master and associate master typically have classification lookup tables, and some or all of the slaves may have classification lookup tables.

In a particular communication system, a participant may maintain a performance lookup table, a classification lookup table, both types of lookup tables, or a lookup table that includes both performance and classification data. For example, a particular implementation of a communications network may be configured to use performance lookup tables, and channels are classified as needed based on comparing the performance data to one or more performance criteria. Storing performance data provides more information about the performance of the communications system, but may require additional storage space. Other implementations may be configured to use classification lookup tables, which may minimize storage requirements because the data need only include data indicating the whether a channel is good or bad instead of a variety of potential performance measurements. However, less information is available about the performance of each channel for each participant.

Although embodiments of the invention are described herein in the context of maintaining channel performance and classification data in lookup tables, channel performance and classification data may be maintained in any form, including but not limited to, other types of tables besides lookup tables or a database.

III. Selecting Channels and Informing Participants

According to one embodiment of the invention, a participant selects a communications channel and identifies the selected communications channel to another participant by using channel identification data. For example, the performance data, such as in a performance lookup table, or the classification data, such as in a classification lookup table, may be used to select a communications channel based on one or more selection criteria. As a particular example, the classification lookup table may classify each channel as either good or bad, and the channel is selected from the good channels that are available between the participant making the selection and the other participant that will use the selected channel to determine on which channel to send a reply.

Figure 3A:
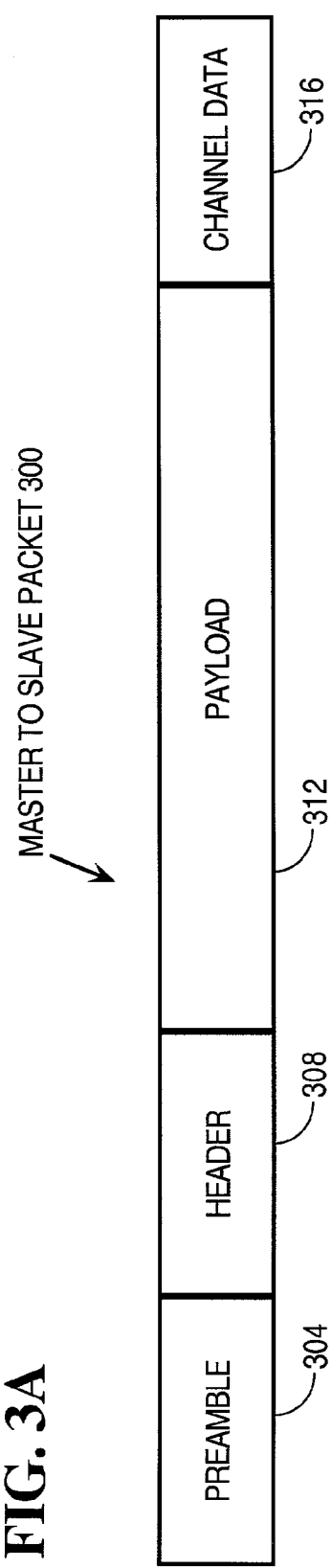
FIG. 3A is a block diagram that depicts a master to slave packet that identifies the selected communications channel, according to one embodiment of the invention.

FIG. 3A is a block diagram that depicts a master to slave packet 300 that identifies the selected communications channel, according to one embodiment of the invention. While the packet example depicted in FIG. 3A is presented as being from a master to a slave, in general such a packet may be transmitted from any participant to another participant, including an associate master participant, and the invention is not limited to a particular manner of making transmissions.

Master to slave packet 300 is transmitted by the master to a particular slave. Master to slave packet 300 includes a preamble 304, a header 308, a payload 312, and channel data 316. Master to slave packet 300 may be used in a Bluetooth or an IEEE 802.15.1 FH communications system. Preamble 304, header 308, and payload 312 may be the portions of a normal, or standard, packet for the particular communications system, and channel data 316 may be appended, or "piggybacked", onto the normal packet. Therefore, a special packet is not required to provide channel data 316 from the master to a slave. However, in other implementations and other communications systems, channel data 316 may be incorporated into other parts of a normal packet, or a special packet may be used, which incorporates channel data 316.

Preamble 304 is used to identify the FH communications system and for the slaves to synchronize with the master. Preamble 304 is a binary string whose length depends on the communications protocol. For example, for a Bluetooth based FH communications system, known preamble 304 is 72 bits in length.

Header 308 includes control information, such as the origination and destination address of the packet, the type of packet, and the priority level for the packet.

Payload 312 includes the contents or data being carried by master to slave packet 300, as compared to the control information, or overhead, of header 308.

Channel data 316 identifies the selected communications channel. For example, in a Bluetooth based FH communications system, a master may select channel 42 based on a performance data lookup table, such as by identifying the selected communications channel based on selection criteria and the performance data for the channels between the master and the particular slave to which master to slave packet 300 is to be sent.

When a slave receives master to slave packet 300 that includes channel data 316, the slave may determine the particular communication channel on which to respond, hereinafter referred to as the response communications channel, by using one or more of a number of approaches. For example, the selected channel that is identified by channel data 316 may be treated by the slave as the communications channel on which the slave is to respond to the master. As another example, the selected channel that is identified by channel data 316 may be treated by the slave as a communications channel that the slave is not to use when responding. As yet another example, the selected channel that is identified by channel data 316 may be treated by the slave as a communications channel that the slave is to skip in a sequence of channels, such as a frequency hopping sequence, and thus the slave moves onto the next channel in the sequence instead of using the selected communications channel.

According to another aspect of the invention, channel data 316 may include a redundancy technique, such as being 1/3 FEC encoded, to help the slave that receives channel data 316 to properly understand channel data 316 even if errors occur during the transmission.

According to another embodiment of the invention, a participant responds on a particular communications channel that is determined based on a selected communications channel, and the participant provides as part of the response a measurement of the performance of the previous communications channel used for the previous transmission to the participant, and the transmission is not limited to a particular manner of making transmissions.

Figure 3B:
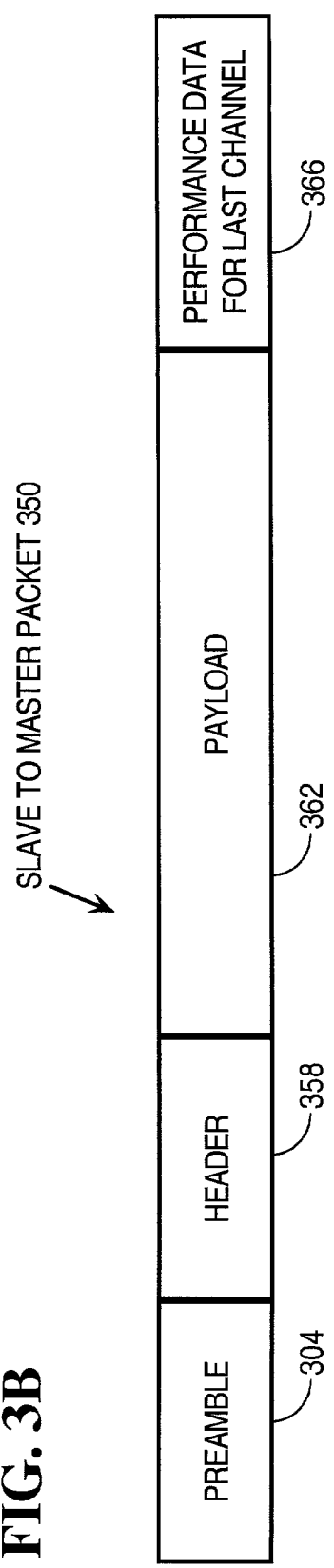
FIG. 3B is a block diagram that depicts a slave to master packet that includes a performance measurement for a previous communications channel, according to one embodiment of the invention.

FIG. 3B is a block diagram that depicts a slave to master packet 350 that includes a performance measurement for a previous communications channel, according to one embodiment of the invention. While the packet example depicted in FIG. 3B is presented as being from a slave to a master, in general such a packet may be transmitted from any participant to another participant, including an associate master participant.

Slave to master packet 350 is transmitted by the slave to the master in response to master to slave packet 300 that the master transmitted to the slave. Slave to master packet 350 includes preamble 304, a header 358, a payload 362, and performance data for last channel 366. Master to slave packet 300 may be for a Bluetooth or an IEEE 802.15.1 FH communications system. Preamble 304, header 318, and payload 362 may be the portions of a normal, or standard, packet for the particular communications system, but with performance data for last channel 366 incorporated into the normal packet after payload 362. However, in other implementations and other communications systems, performance data for last channel 366 may be incorporated into other parts of a normal packet, such as between header 358 and payload 362, or included in a special packet.

Preamble 304 in slave to master packet 350 is the same as preamble 304 in master to slave packet 300 because in this example, both packets are used in the same communications system and therefore both packets use the same preamble 304 for identification of the communications system.

Header 358 includes control information, such as the origination and destination address of the packet, the type of packet, and the priority level for the packet. The contents of header 358 are typically different from the contents of header 308 because the control information is different between slave to master packet 350 and master to slave packet 300 (e.g., the origination and destination addresses are different).

Payload 362 includes the contents or data being carried by slave to master packet 350, as compared to the control information, or overhead, of header 358.

Performance data for last channel 366 is data that indicates a performance measurement of the channel used by the master to send master to slave packet 300 to the slave. For example, the slave may use one of the channel performance measurement techniques discussed above to determine a score for the transmission of master to slave packet 300, such as a BER score or an RSSI value. By including performance data in the reply packet from the slave to the master, the master may obtain performance data on other channels and on the master to slave transmission direction in addition to performance data on the channels used by slaves to communicate with the master and on communications in the master to slave direction. According to another embodiment of the invention, the slave provides a channel classification instead of a channel performance measurement.

IV. Network and Participant Initialization

Communications systems conventionally perform an initialization procedure to identify and/or locate the participants and to elect a master participant. FIG. 4 is a flow diagram 400 that depicts an approach for initializing a communications arrangement having a master participant, according to an embodiment of the invention. For purposes of explanation, embodiments of the invention are described hereinafter in the context of exchanging data between participants using packets. Any type of packet may be used and the invention is not limited to any particular packet. For example, the packets may include a preamble, header, payload and tail, alone or in any combination. Furthermore, embodiments of the invention are described in the context of frequency hopping where successive data packets are transmitted on different frequency channels and each participant transmits in an assigned time slot, although the invention is not limited to the frequency hopping context.

In block 404, participants are identified, such as participants P1 through P5 in FIG. 1A. For example, in a Bluetooth FH communications system, a connection is established between two participants, and then other participants join the communications system. The first two devices may find each other in a variety of ways. For example, one participant may continually scan one channel for a specified amount of time while the other participant transmits a specified sequence on each available channel. After each transmission on a channel, the other device listens for a specified amount of time for a reply. When both participants are on the same channel, the first device "hears" the other device and replies with a transmission on the same channel. Negotiation for a link between the two participants may then be performed.

The additional participants may join the communications system via the same procedure, although the communications system may be put on hold while another participant is added.

In block 408, a master participant is selected according to a specified selection algorithm. In the present example, participant P4 is selected as the master participant, either by all of participants P1–P5, by the other participants P1–P3 and P5, or by some other mechanism or process involved in the management of communications arrangement 100. For example, in the example above, the participant transmitting the predefined sequence may be specified as the default master, although the default may be changed by the specified selection algorithm.

In block 412, a frequency hopping sequence is selected, provided that the communications system uses a frequency hopping protocol. The invention is not limited to any particular frequency hopping sequence or approach for selecting the frequency hopping sequence, nor to a communications system that uses a frequency hopping sequence to select which channels to use out of a set of channels.

In block 414, an associate master participant is selected. The selection of the associate master is made from the other participants in the communications arrangement, such as participants P1–P3 and P5. In the present example, participant P5 is selected as the associate master participant. The selection of an associate master may be made by the participants P1, P2, P3, and P5, or the master participant P4, or any type of selection mechanism that may be integrated into communications arrangement 100, or which may be separate from communications arrangement 100.

In block 416, a determination is made whether the master supports the enhanced mode of selecting a channel based on channel performance, according to an embodiment of the invention. If not, the approach continues to block 420 that indicates that all the participants of the communications system use the normal, or non-enhanced, mode because the master does not support the enhanced mode (even if some or all the other participants support the enhanced mode). In the non-enhanced mode, channels are not selected based on channel performance as described herein.

However, if in block 416 the master is determined to be able to support the enhanced mode of selecting a channel based on channel performance, the approach continues to block 424 that indicates that the participants that support the enhanced mode can use the enhanced mode. Note that not all participants are required to support the enhanced mode, so that if some participants, such as some legacy devices acting as slaves or as an associate master, do not support the enhanced mode, communications may continue to be carried out according to the non-enhanced mode for communications with those participants. Once communications arrangement 100 has been initialized, master P4 begins performing its assigned functions. Participants P1, P2, P3, and P5 perform functions as instructed by master P4 and communicate with master P4.

The order in which the steps described with respect to blocks 412, 414, and 416 are performed may vary depending upon the requirements of a particular application. For example, the associate master participant may be selected before the frequency hopping sequence is selected.

Once communications arrangement 100 has been initialized, master participant P4 begins performing its assigned functions. Slave participants P1–P3 and associate master participant P5 perform functions as instructed by master participant P4 and also communicate with master participant P4. Associate master participant P5 may also perform periodic checks to determine whether master participant P4 can no longer perform its assigned functions and whether the associate master participant P5 is to assume the role of master participant P4.

According to one embodiment of the invention, participants that maintain data indicating the performance and/or classification of channels may reset the stored data when the communications system is initialized. For example, if a participant, such as a master, associate master, or a slave, has a classification lookup table that indicates whether each channel between the participant and the other participants is either good or bad, the entries in the lookup table may be reset to good at initialization. Such a resetting approach may be useful in communications systems that are configured to reclassify channels as bad when unacceptable performance measurements are determined. As time passes, more channels are reclassified as bad due to the transient nature of interference and other sources of poor channel performance, which limits the number of good channels that are available. However, some channels that are previously determined to be bad may no longer have poor channel performance, such as when the source of the interference is no longer present or otherwise changes. Therefore, by resetting the lookup tables at initialization, the number of potentially good channels available is increased and previously bad channels that are no longer subject to poor performance may be used again.

V. Master Connection Sequence

Example functions performed by a master are now described with reference to flow diagrams 500, 530, 550, and 580 of FIGS. 5A, 5B, 5C, and 5D, respectively. The four example functions described hereinafter are: (1) sending a normal packet to a recipient; (2) requesting an associate master to assume the role of master; (3) requesting that another participant send the participant's lookup table data to the master; and (4) requesting a slave to assume the role of associate master. While the examples below use a master, an associate master, and one or more slaves, a network with any types of participants, including but not limited to masters, associate masters, and slaves, may employ the approaches described therein. Also, while the examples herein include storing classification data in lookup tables, other approaches for maintaining data may be used, and the invention is not limited to a particular approach.

Note that, in general, an associate master may perform the functions performed by a slave since the associate master is typically a slave that has been designated as the successor to the master. However, a slave generally does not perform the functions of an associate master. For convenience, the term "recipient" is used herein to denote a participant communicating with a master, and the recipient may be any type of participant, including but not limited to, an associate master or a slave. As a result, the following examples are generally described in terms of interactions between a master and a recipient although the examples are equally application to interactions between a master and associate master or slave as well as other types of participants.

A. Normal Packet

Figure 5A:
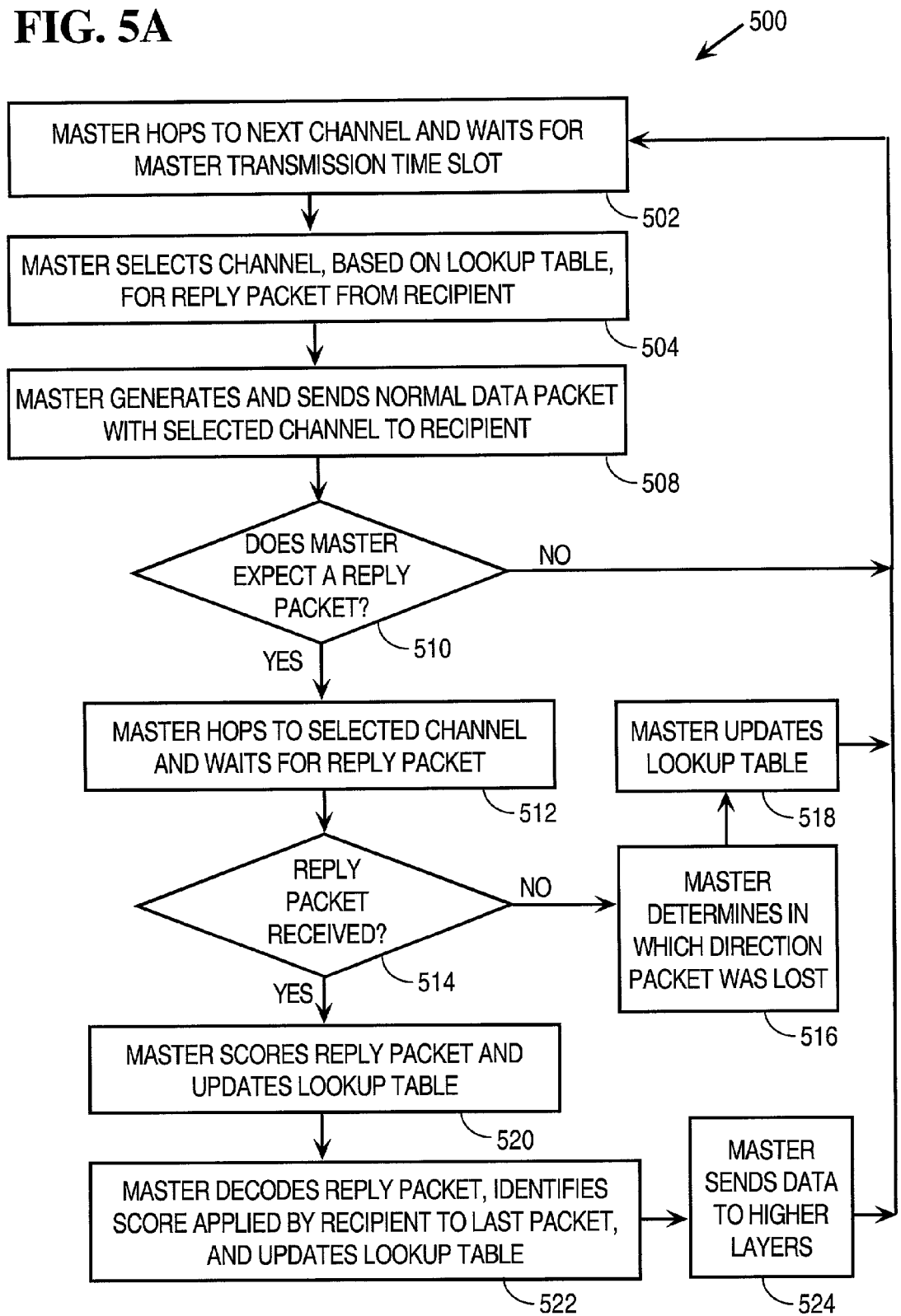
FIG. 5A is a flow diagram that depicts an approach for a master to send a normal packet to a recipient, according to an embodiment of the invention.

FIG. 5A is a flow diagram 500 that depicts an approach for a master to send a normal packet to a recipient, according to an embodiment of the invention. While FIG. 5A describes the transmission of a normal packet between a master and a recipient (i.e., a slave or an associate master), other participants may utilize a similar approach for sending and receiving packets. Also, while FIG. 5A and the other figures discussed herein depict a certain set of steps arranged in a particular order, the invention is not limited to the particular steps and order shown in the figures herein, and additional or fewer steps and other orderings of steps may be used in other implementations and communications systems.

In block 502, the master hops to the next channel and waits for the master transmission time slot. As is conventional in time division multiple access protocols, each participant communicates during a particular period of time referred to as a time slot.

In block 504, the master selects a communications channel to be used by the recipient in sending a reply packet. The communications channel is selected based on the lookup table that includes channel classifications. For example, the master may select the communications channel from among the channels between the master and the recipient that are classified as good. However, in other implementations, the master may maintain a performance data lookup table and select the channel from among those channels having a score above a specified threshold. In general, any type of selection criteria may be used, including but not limited to, selecting the channel with the highest score.

While the example of FIG. 5A has the recipient using the selected channel for replying to the master, in general, the recipient may use the selected communications channel in a number of ways, including but not limited to, avoiding the use of the selected communications channel or skipping the selected communications channel in a sequence of channels used by the communications system. Also, the master may use a lookup table that has performance data instead of classification data, or both types of data, or even another source of stored data that reflects the performance of the communications channels.

In block 508, the master generates and sends a normal packet to a recipient. For example, the master may use master to slave packet 300.

In block 510, a determination is made whether the master expects a reply packet from the recipient. If not, such as when the master sends a NULL packet, then the process returns to block 502. If the master participant does expect a reply packet from the recipient, then in block 512, the master hops to the selected channel and waits to receive the reply packet from the recipient. For example, the slave may reply by sending slave to master packet 350.

If, in block 514, the reply packet is received from the recipient, then the process continues to block 520, which is discussed below. However, if in block 514, the reply packet is not received, e.g., within a specified period of time, then in block 516, the master determines in which direction the packet was lost. For example, the packet sent from the master to the recipient may have been lost, the reply packet from the recipient to the master may have been lost, or both packets may have been lost.

One approach for determining in which direction the packet was lost is to measure the RSSI on the channel that the recipient was to use for the reply packet. A high RSSI may indicate that there is interference on the channel and therefore that the reply packet was lost from the recipient to the master. Conversely, a low RSSI may indicate that there is no interference on the channel and therefore that the packet from the master to the recipient was lost. However, due to the transient nature of interference, in some situations, a conclusive determination may not be possible because the interference may not be the same when the RSSI is measured as when the packets are transmitted.

In block 518, the master updates the master's lookup table to reflect that a reply packet was not received from the recipient. For example, if the master maintains a classification data lookup table, the master may change the classification of the selected channel from good to bad. From block 518, the process returns to block 502.

Returning to block 520, the master scores the reply packet and updates the master's lookup table to reflect the score. For example, the master may use a channel performance measurement technique, such as those discussed above, to determine a BER score or an RSSI value based on the reply packet.

In block 522, the master decodes the reply packet, identifies the score applied by the recipient to the last packet sent from the master to the recipient, and updates the master's lookup table to reflect the score from the s recipient lave. For example, the reply packet may be slave to master packet 350 that includes performance data for last channel 366 that measures the performance of the channel used to send master to slave packet 300.

In block 524, the master sends data to higher layers as appropriate. The reply packet may include data that is to be processed by a higher layer in the master participant device. One example of such data is performance data from the recipient that indicates the quality of transmission from the master participant to the recipient. From block 524, the process returns to block 502.

B. Request Handover Packet

Figure 5B:
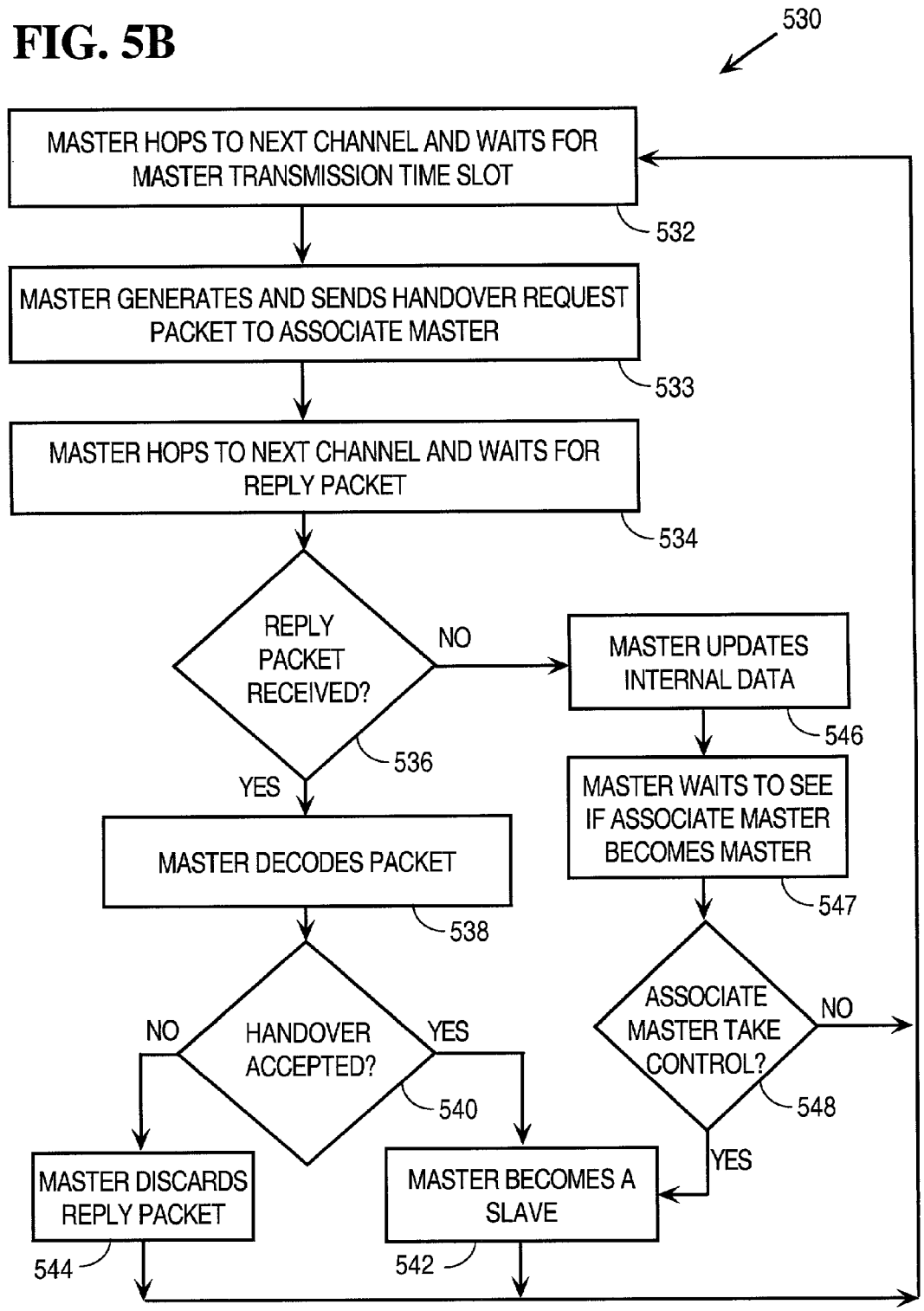
FIG. 5B is a flow diagram that depicts an approach for a master to send a packet to an associate master requesting the associate master to assume the role of master, according to an embodiment of the invention.

FIG. 5B is a flow diagram 530 that depicts an approach for a master to send a packet to an associate master requesting the associate master to assume the role of master, according to an embodiment of the invention. There may be a variety of reasons why the master participant may request that the associate master participant assume the role of the master participant and perform the functions assigned to the master participant. For example, the master participant's power level may have dropped below a specified threshold. As another example, the master participant may have moved out of range of one or more slave participants and can no longer adequately communicate with those slave participants. As yet another example, there may be a noise source that is interfering with communications between the master participant and one or more slave participants. The noise source may be in close proximity to the master participant, but not the associate master participant. Thus it is desirable for the associate master participant to assume the role of the master participant.

In block 532, the master participant hops to the next channel and waits for the master transmission time slot.

In block 533, the master participant generates and sends to the associate master participant a handover request packet. The handover request packet contains data that represents a request for the associate master participant to assume the role of the master participant and perform the functions assigned to the master participant.

In block 534, the master participant hops to the next channel and waits for a reply packet from the associate master. Note that in this situation, it is assumed that the master participant expects a reply packet from the associate master participant. In some applications, the master participant may not necessarily expect a reply packet from the associate master participant.

In block 536, a determination is made whether the master participant has received a reply packet from the associate master participant. If so, then in block 538, the master participant decodes the reply packet. Then, in block 540, the master participant determines, based upon the contents of the reply packet, whether the associate master participant has accepted the handover request. If so, then in block 542, the master participant becomes a slave participant and updates its internal state data accordingly. At this point, the master participant assumes that the associate master participant has taken the steps necessary to assume the role of the master participant and the process is returns to block 532.

If in block 536, the master has not received the reply packet, the process continues to block 540 where the master participant determines, based upon the contents of the reply packet, whether the associate master participant has not accepted the handover request. If so, then in block 544, the reply packet is discarded and the process returns to block 532. In this situation, the associate master participant has affirmatively declined the request to become the master participant and the master participant may make another request at another time.

Returning to block 536, if the master participant does not receive a reply packet from the associate master participant, then in block 546, the master participant updates its internal data to reflect this fact. There are several reasons why the master participant may not receive a reply packet from the associate master participant. For example, the associate master participant may have failed. As another example, the associate master participant may not have received the handover request packet from the master participant. As yet another example, the associate master participant may have received the handover request packet and sent a reply packet, but the reply packet was never received by the master participant. This may occur, for example, if the associate master participant has moved out of range of the master participant.

The master participant does not necessarily know why a reply packet was not received. Accordingly, in block 547, the master participant then waits to see if the associate master participant assumes the role of the master participant. According to one embodiment of the invention, upon assuming the role of the master participant, the associate master participant notifies all participants by transmitting a broadcast message that will be received by the current master participant.

If, in block 548, the master participant determines that the associate master participant has assumed the role of the master participant, then in block 542, the master participant assumes the role of a slave participant and the process returns to block 532. According to one embodiment of the invention, the master participant waits a specified amount of time to detect a broadcast message from the associate master. If, in block 548, the associate master participant has not assumed the role of the master participant within a specified period of time, then the master participant retains control and the process returns to block 532.

C. Request Table Data Packet

Figure 5C:
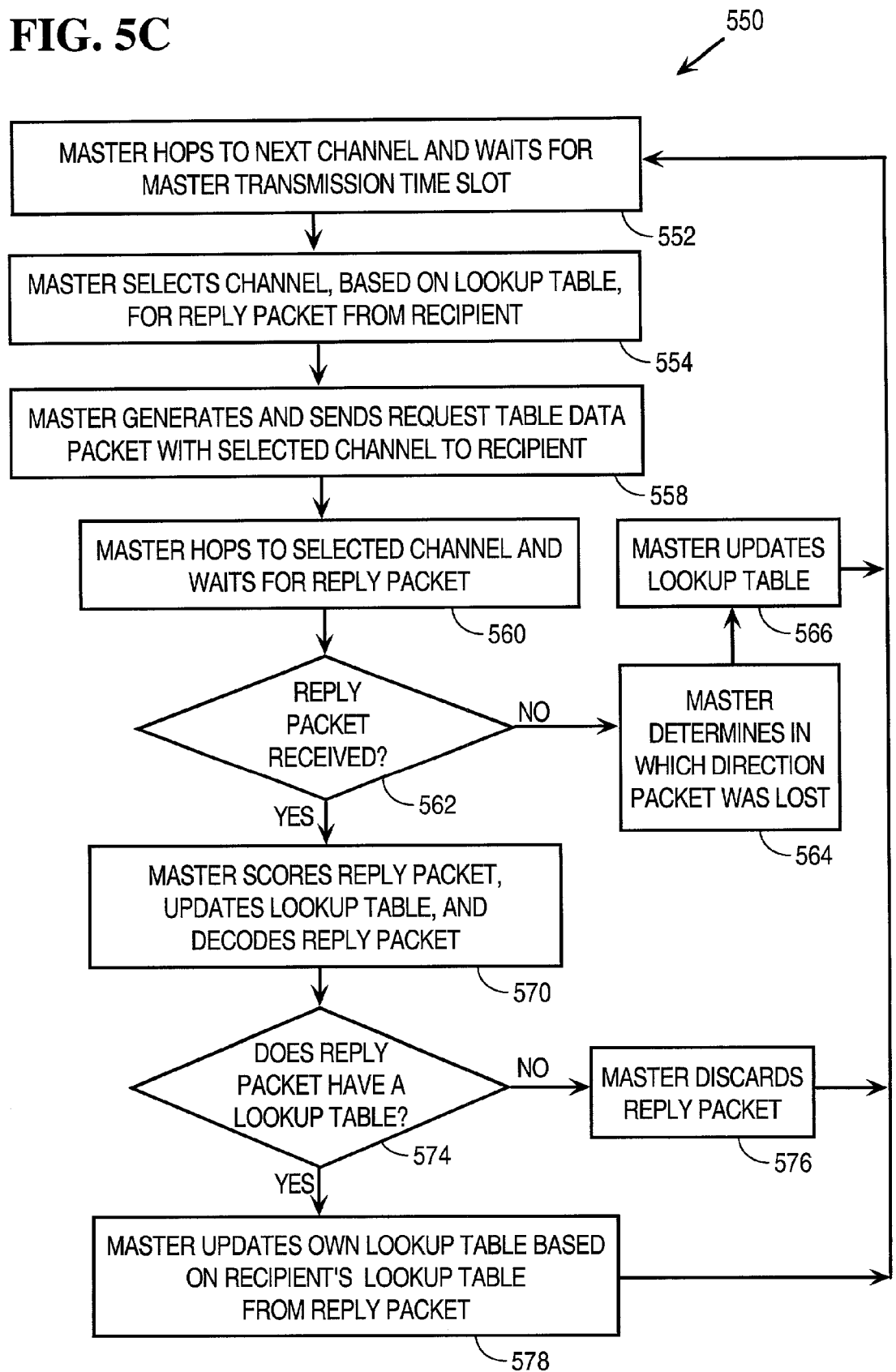
FIG. 5C is a flow diagram that depicts an approach for a master to send a request table data packet to a recipient, according to an embodiment of the invention.

FIG. 5C is a flow diagram 550 that depicts an approach for a master to send a request table data packet to a recipient, according to an embodiment of the invention. While FIG. 5C describes the transmission of a request table data packet between a master and a recipient (i.e., a slave or an associate master), other participants may employ a similar approach for sharing performance data.

In block 552, the master hops to the next channel and waits for the master transmission time slot.

In block 554, the master selects a communications channel to be used by the recipient in sending a reply packet. The communications channel is selected based on the lookup table that includes channel classifications. For example, the master may select the communications channel from among the channels between the master and the recipient that are classified as good. However, in other implementations, the master may maintain a performance data lookup table and select the channel from among those channels having a score above a specified threshold value. In general, any type of selection criteria may be used, including but not limited to, selecting the channel with the highest score.

While the example of FIG. 5C has the recipient using the selected channel for replying to the master, in general, the recipient may use the selected communications channel in a number of ways, including but not limited to, avoiding the use of the selected communications channel or skipping the selected communications channel in a sequence of channels used by the communications system. Also, the master may use a lookup table that has performance data instead of classification data, or both types of data, or even another source of data that reflects the performance of the communications channels.

In block 558, the master generates and sends a request table data packet to a recipient. For example, the request table data packet may identify one or more channels between one or more participants and request that the recipient provide the performance and/or classification data that the recipient has on the identified channels for the identified participants. As another example, the request table data packet may request that the recipient provide all of the data that the recipient has in the recipient's lookup table or tables.

In block 560, the master hops to the selected channel and waits to receive the reply packet from the recipient.

If, in block 562, the reply packet is received from the recipient, then the process continues to block 570, which is discussed below. However, if in block 562, the reply packet is not received, e.g., within a specified period of time, then in block 564, the master determines in which direction the packet was lost as discussed above in reference to block 516 of FIG. 5A.

In block 566, the master updates the master's lookup table to reflect that a reply packet was not received from the recipient. For example, if the master maintains a classification data lookup table, the master may change the classification of the selected channel from good to bad. From block 566, the process returns to block 552.

Returning to block 570, the master scores the reply packet, updates the master's lookup table to reflect the score, and decodes the reply packet. For example, the master may use a channel performance measurement technique, such as those discussed above, to determine a BER score or an RSSI value based on the reply packet.

In block 574, the master determines whether the reply packet has a lookup table. If not, then the process continues to block 576 where the master discards the reply packet, and then the process returns to block 552. However, if the reply packet includes a lookup table, or whatever data was requested by the master from the recipient, the process continues on to block 578.

In block 578 the master updates the master's own lookup table based on the lookup table information included in the reply packet from the recipient. For example, the master may average scores in the master's performance lookup table with those from the recipient, or the master may update the master's classification lookup table to change the master's classification of good channels to bad based on whether the channels are classified as bad in the recipient's classification lookup table. From block 578, the process returns to block 552.

D. Request Associate Master Packet

Figure 5D:
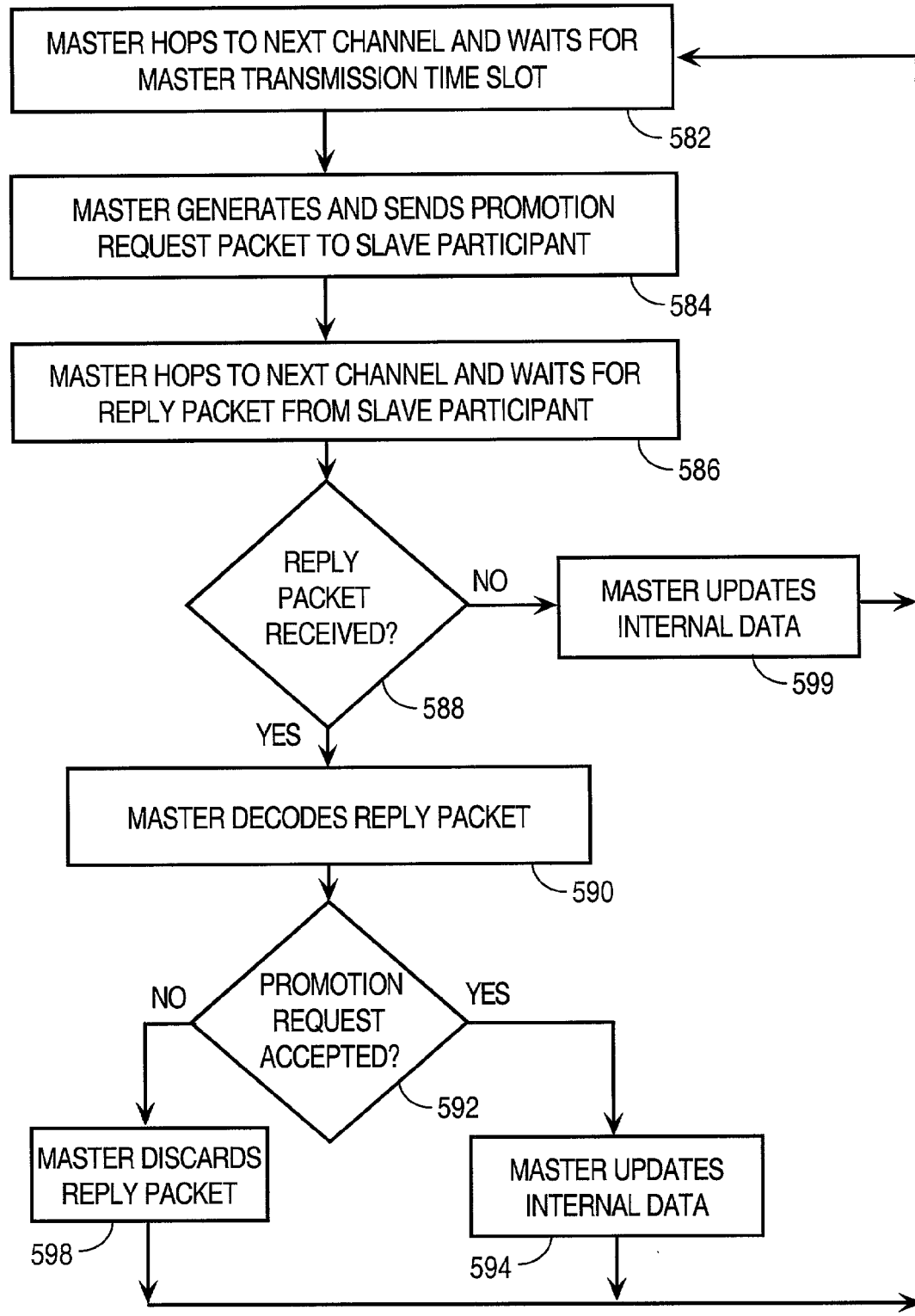
FIG. 5D is a flow diagram that depicts an approach for a master to send a packet to a slave requesting the slave to assume the role of associate master, according to an embodiment of the invention.

FIG. 5D is a flow diagram 580 that depicts an approach for a master to send a packet to a slave requesting the slave to assume the role of associate master, according to an embodiment of the invention.

In block 582, the master participant hops to the next channel and waits for the master transmission time slot. In block 584, the master participant generates and sends to the slave participant a promotion request packet to request that the slave participant assume the role of associate master participant.

In block 586, the master participant hops to the next channel and waits for a reply packet from the slave participant. Note that in this situation, the master participant expects a reply packet from the slave participant.

In block 588, a determination is made whether the master participant has received a reply packet from the slave participant. If so, then in block 590, the master participant decodes the reply packet. In block 592, the master participant determines, based upon the contents of the reply packet, whether the slave participant has accepted the promotion request and will assume the role of the associate master participant. If a determination is made that the slave participant did accept the promotion request, then in block 594, the master participant updates its internal data to reflect that the slave participant is now the associate master participant. The process returns to block 582.

If, in block 592, the master participant determines, based upon the contents of the reply packet, that the slave participant has not accepted the promotion request, then in block 598, the reply packet is discarded and the process returns to block 582.

Returning to block 588, if the master participant does not receive a reply packet from the slave participant, then in block 599, the master updates its internal data to reflect this fact. The slave participant may not have received the promotion request packet from the master participant. Alternatively, the master participant may not have received the reply packet from the slave participant. For example, in the context of mobile devices, the slave participant may have moved out of range of the master participant. The process returns to block 582.

VI. Associate Master Assuming Role as Master

Associate master participants may be selected according to any technique and the invention is not limited to any particular technique. As previously described herein, the associate master participant takes over as master participant if requested by the master participant or if the associate master participant determines that the master participant is not capable of performing its assigned functions. According to one embodiment of the invention, if the associate master does not detect a data packet from the master participant within a specified period of time, then the associate master participant assumes that the master participant has failed or is out of range and takes over as the master participant. This determination may be made using a variety of techniques depending upon the requirements of a particular application and the invention is not limited to any particular technique. For example, associate participants may employ a timer. When the associate master participant receives the status data from the master participant, the timer is reset. If the status data is not received before expiration of the timer, then the associate master participant assumes the role of the master participant.

Figure 7A:
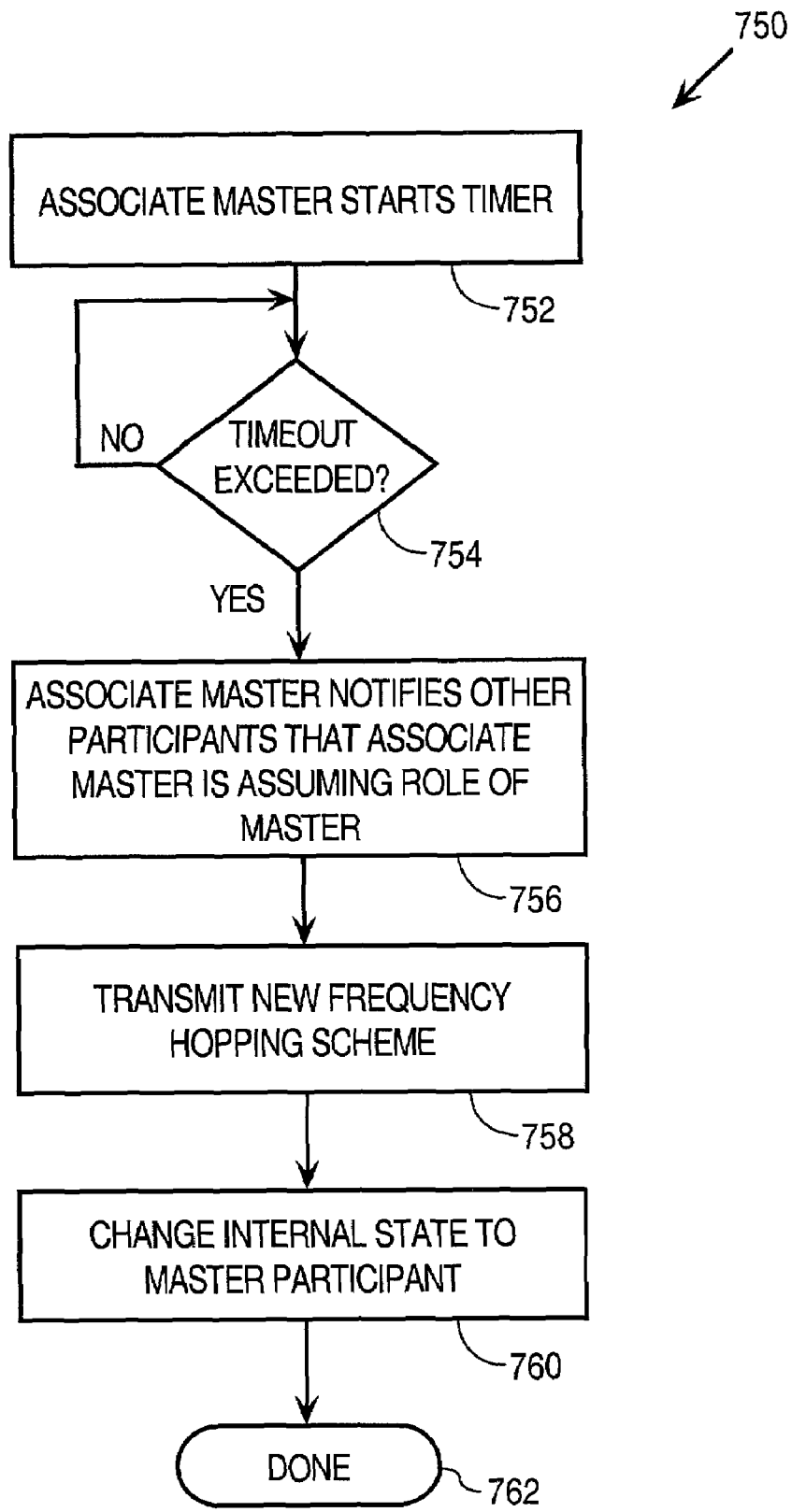
FIG. 7A is a flow diagram that depicts steps performed by an associate master participant using a timer to determine that the master participant has failed according to an embodiment of the invention.

FIG. 7A is a flow diagram 750 that depicts steps performed by an associate master participant using a timer to determine that the master participant has failed, according to an embodiment of the invention.

In block 752, the associate masters starts a time. In block 754, a determination is made whether a timeout, i.e., a specified period of time, has been exceeded. This may be determined, for example, by comparing a time value from the timer to a specified value. If the time value equals or exceeds the specified value, then the timeout has been exceeded. If the time value is less than the specified value, then control continues in block 754.

Once the timeout has been exceeded, then in block 756, the associate master participant notifies the other participants that it is assuming the role of the master participant. According to one embodiment of the invention, the associate master participant broadcasts a message to all other participants in the master participant time slot to notify the other participants that the associate master participant is assuming the role of the master participant. Other approaches may also be used. For example, the associate master may notify the other participants individually.

In block 758, the associate master participant optionally selects a new frequency hopping scheme and notifies all of the other participants. The associate master participant may alternatively continue to use the current frequency hopping scheme. In block 760, the associate master participant changes its internal state to reflect that it has assumed the role of master participant. The process is complete in block 762.

It should be noted that the approach depicted in FIG. 7A is only one example situation in which an associate master participant assumes the role of master participant. As previously described, for example, an associate master participant may detect that a master participant has failed using other techniques, or the current master participant may request that an associate master participant assume the role of master participant.

Slave participants may employ their own timer mechanisms to determine whether the current master participant is no longer capable of performing its assigned functions. According to one embodiment of the invention, if both the associate master participant and the slave participants use timers, then the timeouts used by the associate master participant is set to a shorter time than the timeouts used by the slave participants, so that the associate master participant will determine before the slave participants that the master participant can no longer perform its assigned functions.

VII. Slave and Associate Master Connection Sequence

Example functions performed by a slave are now described with reference to flow diagrams 600, 620, 630, 640, 650 and 670 of FIGS. 6A, 6B, 6C, 6D, 6E, and 6F, respectively. The six example functions described hereinafter are: (1) the initial handling by a recipient of a packet sent by a master; (2) the handling of a packet not intended for a recipient; (3) receiving a normal data packet from a master; (4) sending an update table packet to a master in response to a request table packet; (5) the handling by an associate master of a handover request packet from a master; and (6) the handling by a slave of a promotion request packet from a master. While the examples below are described using a master, an associate master, a slaves, or a recipient (i.e., a slave or an associate master) a network with any type of participant, including but not limited to masters, associate masters, and slaves, may employ the approaches described therein, and the invention is not limited to a particular approach.

A. Initial Handling of Packets

Figure 6A:
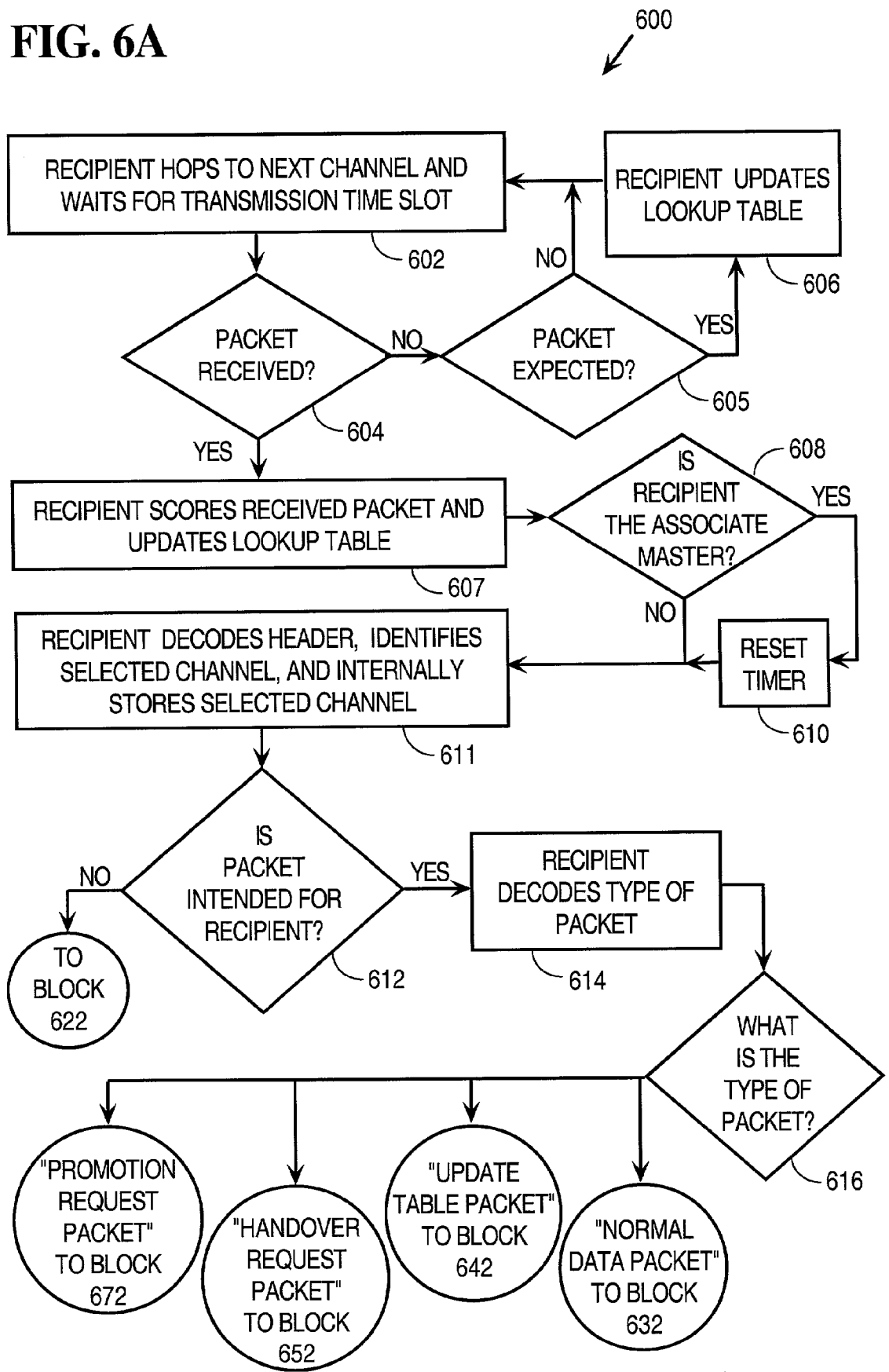
FIG. 6A is a flow diagram that depicts how a recipient initially handles packets that the recipient receives from other participants, according to an embodiment of the invention.

FIG. 6A is a flow diagram 600 that depicts how a recipient initially handles packets that the recipient receives from other participants, according to an embodiment of the invention. While FIG. 6A describes the transmission of packets as being between a master and a recipient (e.g., a slave or associate master), other participants may employ a similar approach for transmitting and receiving data. Also, while FIG. 6A and the other figures discussed herein depict a certain set of steps arranged in a particular order, the invention is not limited to the particular steps and order shown in the figures herein, and additional or fewer steps and other orderings of steps may be used in other implementations and communications systems.

In block 602, the recipient hops to the next channel and waits for the assigned transmission time slot. The next channel may be determined according to a particular frequency hopping scheme employed for the communications system. Once the assigned time slot has arrived, the recipient attempts to detect an incoming packet from a master participant.

In block 604, a determination is made whether a packet has been received. If so, then the process continues to block 607, as discussed below. If not, then the process continues to block 605, where a determination is made whether a packet was expected. In some communications systems, the master is expected to make a transmission at each time slot assigned to the master, whereas in other communications systems, transmissions are not made at every time slot. If a packet was not expected, the process returns to block 602. If a packet was expected and yet not received, the process continues to block 606 where the recipient updates the recipient's lookup table to reflect that a packet was not received, and then the process returns to block 602. The recipient conventionally repeats blocks 602, et seq. as described above, until a packet is detected from the master participant.

If in block 604, the recipient detects a packet from the master, the process proceeds to block 607, where the recipient scores the packet received from the master and updates the recipient's lookup table to reflect the score. For example, the recipient may use a channel performance measurement technique, such as those discussed above, to determine a BER score or an RSSI value based on the received packet.

In block 608, a determination is made whether the recipient is an associate master. If not, then the process continues to block 611. If so, then a timer is reset in block 610 to indicate that the current master participant is still active, and then the process continues to block 611.

In block 611, the recipient decodes the header of the received packet, identifies the selected channel, and maintains information about the selected channel, such as by internally storing the selected channel. For example, the received packet may be similar to master to slave packet 300 with channel data 316 appended to the packet, which identifies the channel selected by the master, such as by following the approach of FIG. 1B. By storing the selected channel internally, the recipient can later retrieve the selected channel. Because other implementations may use channel data 316 to specify a channel that is to be used differently, such as a channel that is not to be used or as another channel to be skipped, the recipient may perform some processing or analysis based on channel data 316 to determine what data is to be maintained.

In block 612, a determination is made whether the packet is intended for the recipient. For example, the header that is decoded in block 610 typically includes information that identifies the intended recipient of the packet. If the recipient is not the intended recipient, the process continues to block 622 that is described below with reference to FIG. 6B.

If the recipient is the intended recipient of the packet received in block 604, the process continues to block 614 where the recipient decodes the type of packet that has been received.

In block 616, if the type of packet is determined to be a normal data packet, the process continues to block 632 that is described below with reference to FIG. 6C. If the type of packet is determined to be an update table packet, then the process continues to block 642 that is described below with reference to FIG. 6D. If the type of packet is determined to be a handover request packet, then the process continues to block 652 that is described below with reference to FIG. 6E. If the type of packet is determined to be a promotion request packet, then the process continues to block 672 that is described below with reference to FIG. 6F.

B. Packet Not Intended for Slave

Figure 6B:
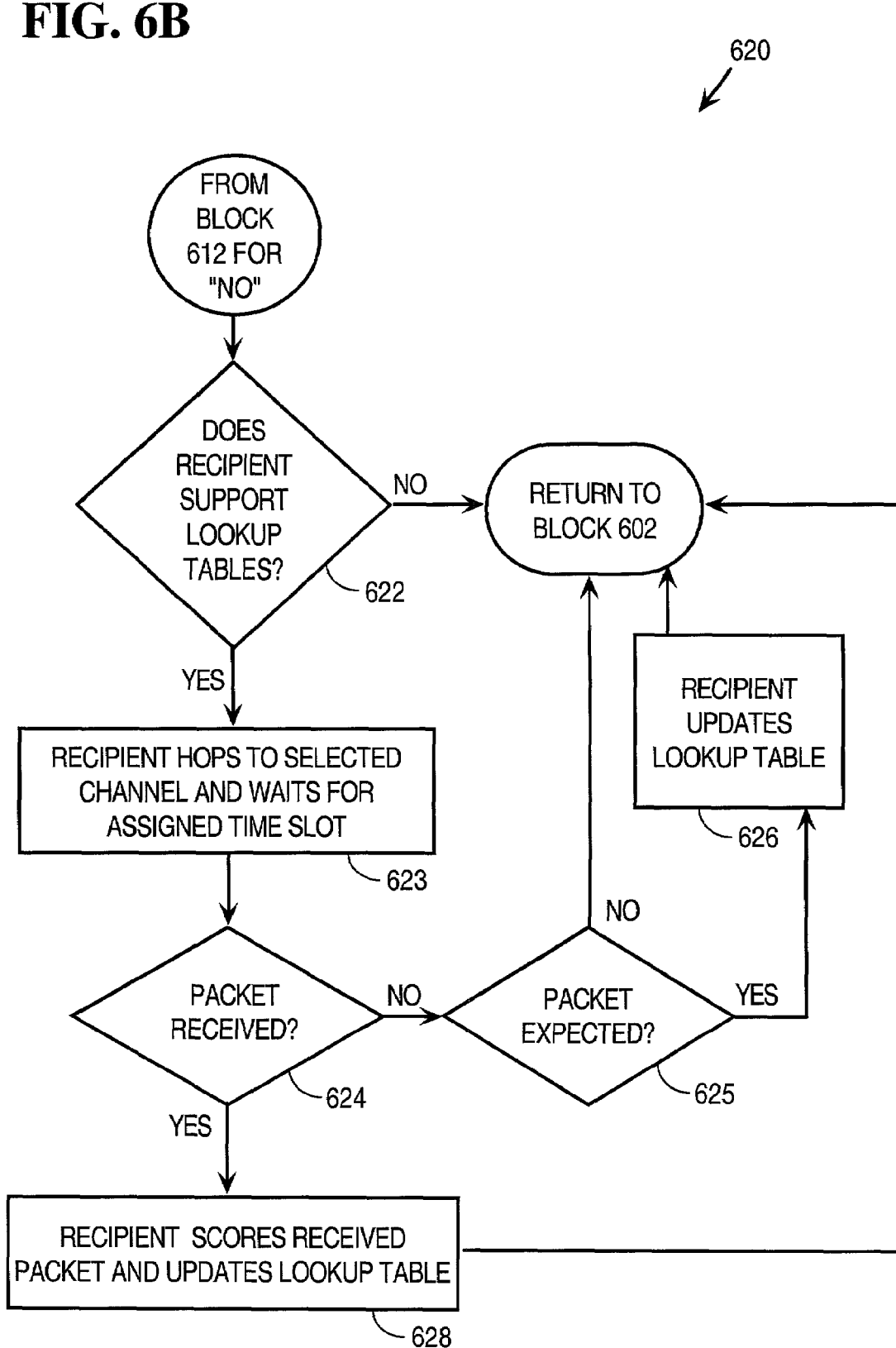
FIG. 6B is a flow diagram that depicts how a recipient handles a packet that is not intended for the recipient, according to an embodiment of the invention.

FIG. 6B is a flow diagram 620 that depicts how a recipient handles a packet that is not intended for the recipient, according to an embodiment of the invention. For convenience, FIG. 6B is discussed in terms of a master and recipient (e.g., a slave or associate master) although any other types of participants may employ the same or similar approach. While the recipient does not respond to a packet that is not intended for the recipient, the recipient may nevertheless listen to the reply packet from the recipient for whom the packet is intended. As a result, the recipient may use the reply transmission to determine the performance of the channel used for the reply between the responding recipient and the recipient. Thus, the recipient may include performance and/or classification data not only on channels between the recipient and the master, but also between the recipient and other participants in the communications system. Whether the recipient updates performance and/or classification data by default depends on the particular implementation, and therefore some implementations may not employ the approach described with respect to FIG. 6B.

While FIG. 6B describes the transmission of packets as being between a master and a recipient, other participants may employ a similar approach for handling packets not intended for the participant that receives the packet.

Block 622 is reached from block 612 when the packet is determined to not be intended for the recipient. In block 622, a determination is made whether the recipient supports the use of lookup tables, or other approaches for maintaining channel performance or classification information. If not, the process returns to block 602 of FIG. 6A. If so, the process continues to block 623.

In block 623, the recipient hops to the selected channel and waits for the recipient's assigned transmission time slot. For example, the selected channel may be the selected channel that is identified by channel data 316 in block 610.

In block 624, a determination is made whether a packet has been received. If so, then the process continues to block 628, as discussed below. If not, then the process continues to block 625, where a determination is made whether a packet was expected. For example, in some communications systems, the master may send a NULL packet for which a reply is not expected from any slave in the communications system. If a packet was not expected, the process returns to block 602. If a packet was expected and yet not received, the process continues to block 626 where the recipient updates the recipient's lookup table to reflect that a packet was not received, and the process returns to block 602.

If in block 624, the recipient detects a packet from the master, the process proceeds to block 628, where the recipient scores the reply packet received from the participant for whom the received packet was intended and who is responding as requested to the master. The recipient updates the recipient's lookup table to reflect the score determined for the reply packet, and the process returns to block 602.

C. Normal Packet

Figure 6C:
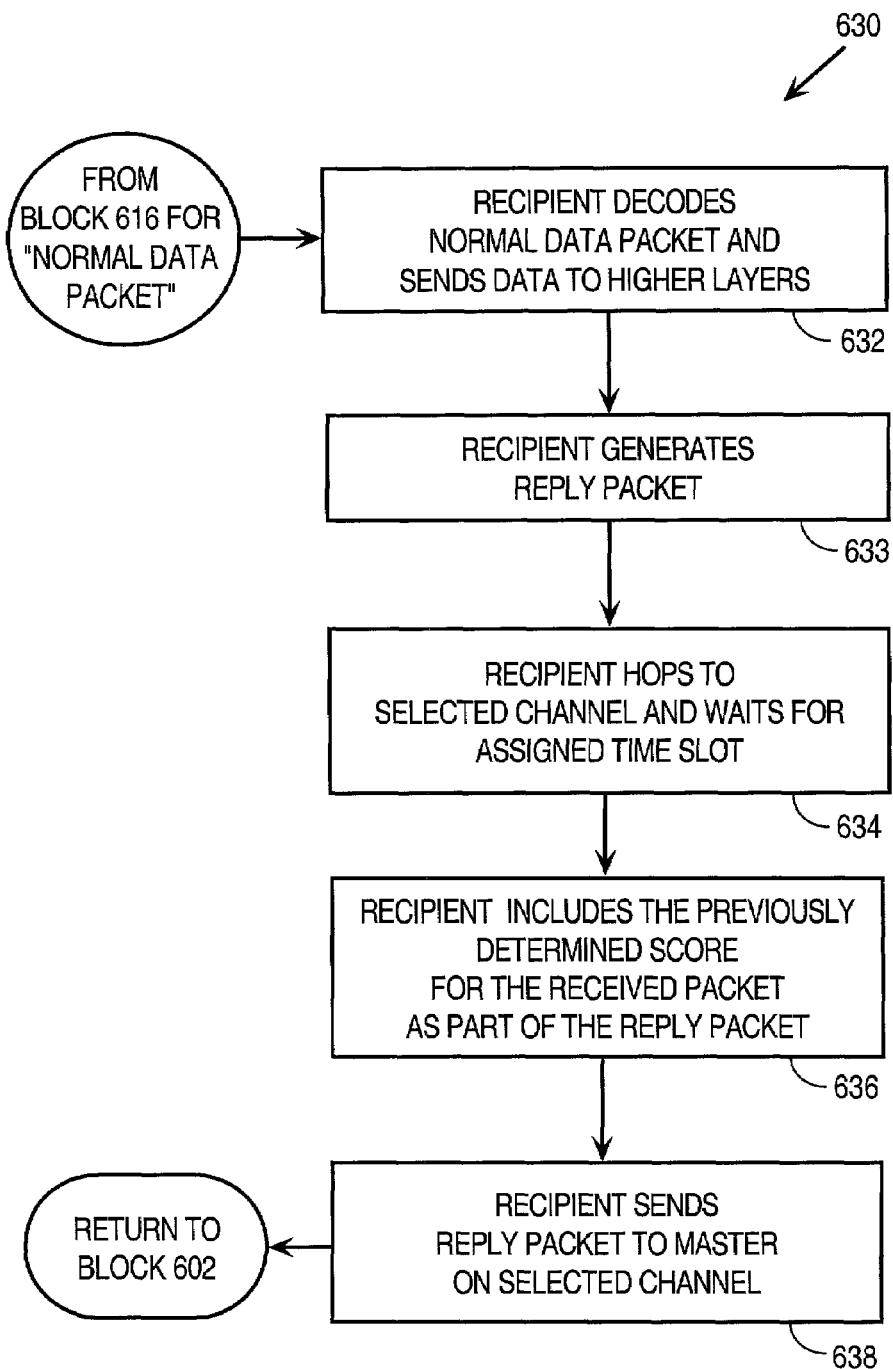
FIG. 6C is a flow diagram that depicts how a recipient handles a normal packet from a master, according to an embodiment of the invention.

FIG. 6C is a flow diagram 630 that depicts how a recipient handles a normal data packet from a master, according to an embodiment of the invention. For convenience, FIG. 6C is discussed in terms of a master and recipient (e.g., a slave or associate master) although any other types of participants may employ the same or similar approach for handling normal data packets being transmitted between participants of the communications system. The normal data packet from the master may be generated and sent to the recipient using the approach discussed above with reference to FIG. 5A.

Block 632 is reached from block 616 when the packet is determined to be a normal data packet intended for the recipient. In block 632, the normal data packet is decoded and data is sent to higher layers in the recipient as necessary. For example, in the situation where the recipient is a device, the data may include one or more commands to be processed by the device.

In block 633, the recipient generates a reply packet. For example, the reply packet may be slave to master packet 350.

In block 634, the recipient hops to the selected channel and waits for the recipient's assigned transmission time slot. The selected channel is the selected channel, such as that identified from channel data 316 in block 610.

In block 636, the recipient includes the previously determined score for the received packet from block 608 as part of the reply packet. For example, the recipient may include performance data for last channel 366 in slave to master packet 350.

In block 638, the recipient transmits the reply packet to the master on the selected channel that is identified in block 610. The process then returns to block 602.

D. Update Table Packet

Figure 6D:
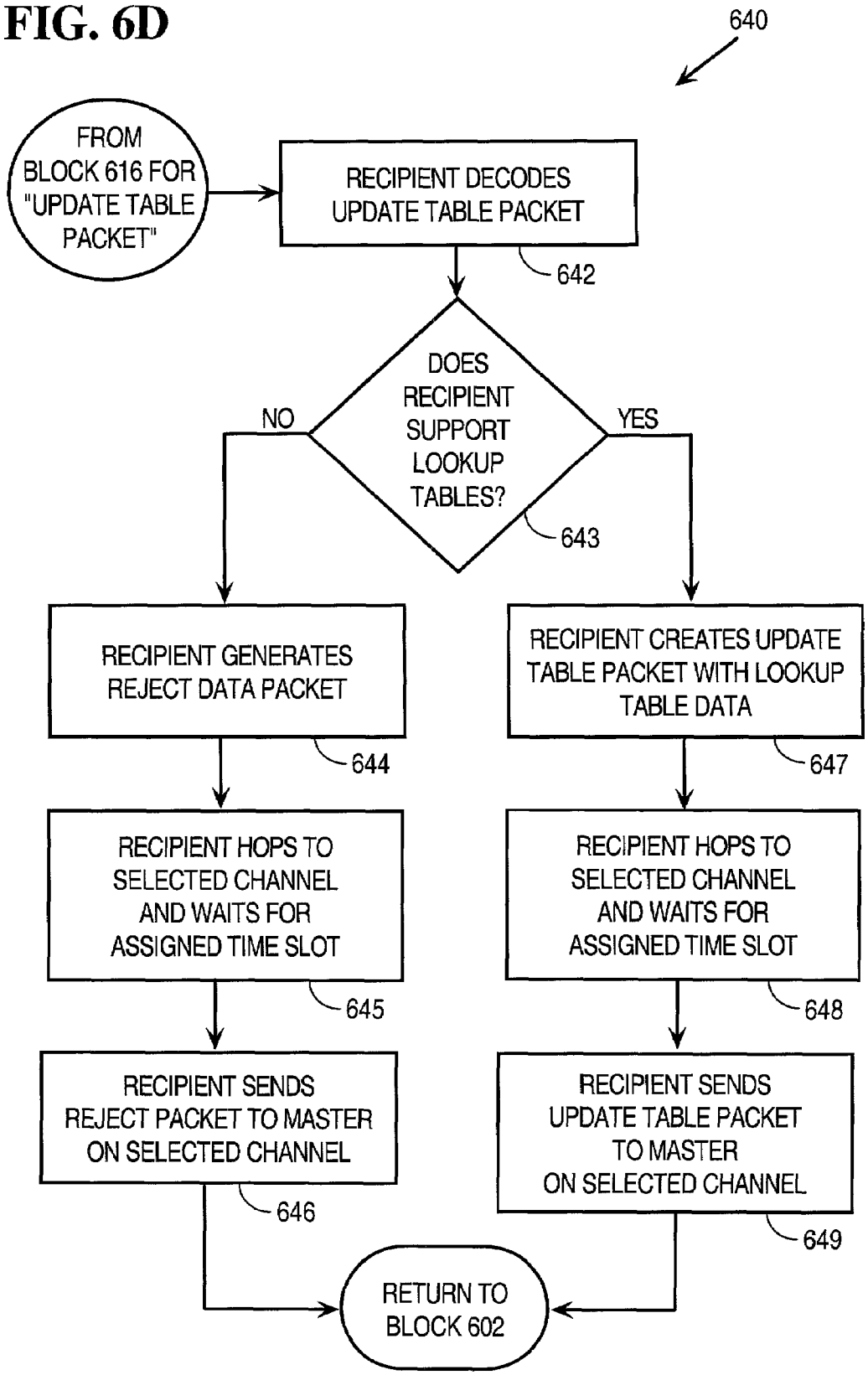
FIG. 6D is a flow diagram that depicts how a recipient sends an update table packet to a master in response to a request table packet, according to an embodiment of the invention.

FIG. 6D is a flow diagram 640 that depicts how a recipient sends an update table packet to a master in response to a request table packet, according to an embodiment of the invention. For convenience, FIG. 6B is discussed in terms of a master and recipient (e.g., a slave or associate master) although any other types of participants may employ the same or similar approach for sending request table packets and sending update table packets. The request table packet from the master may be generated and sent to the recipient using the approach discussed above with reference to FIG. 5C.

Block 642 is reached from block 616 when the packet is determined to be an update table packet intended for the recipient. In block 642, the recipient decodes the update table packet.

In block 643, determination is made whether the recipient supports the use of lookup tables, or other approaches for storing channel performance or classification information. If not, the process continues to block 644, and if so, the process continues to block 647.

In block 644, the recipient generates a reject data packet. The reject data packet includes data that indicates to the master participant that the recipient will not send lookup table information to the master. In block 645, the recipient hops to the selected channel and waits for the recipient's assigned transmission time slot. In block 646, the recipient sends the reject data packet to the master on the selected channel, and the process returns to block 602.

In block 647, the recipient creates an update table packet with the lookup table data requested by the master in the request table data packet. In block 648, the recipient hops to the selected channel and waits for the recipient's assigned transmission time slot. In block 649, the recipient sends the update table packet to the master on the selected channel, and the process returns to block 602.

E. Handover Request Packet

Figure 6E:
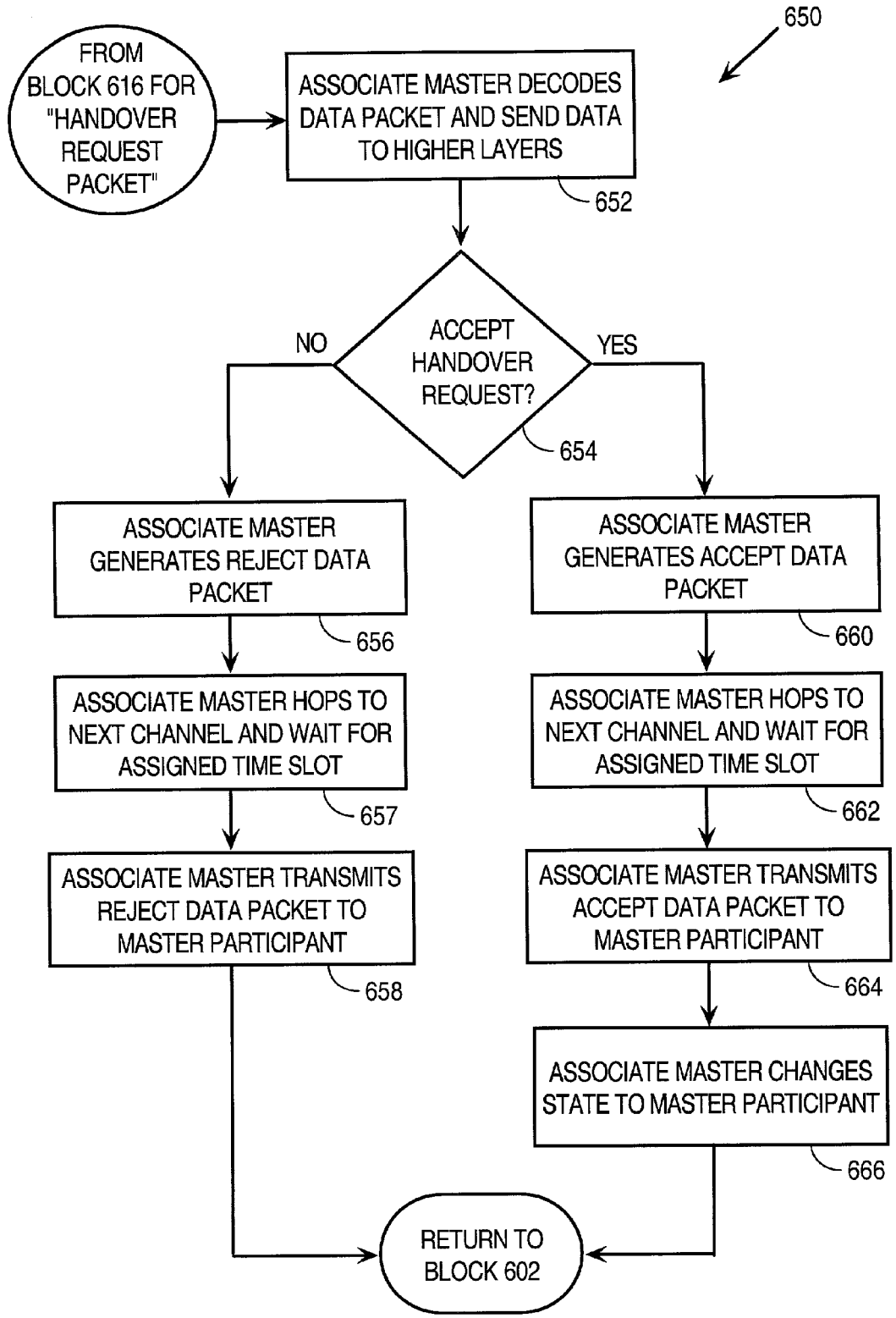
FIG. 6E is a flow diagram that depicts how an associate master handles a handover request packet from a master, according to an embodiment of the invention.

FIG. 6E is a flow diagram 650 that depicts how an associate master handles a handover request packet from a master, according to an embodiment of the invention. In this context, the handover request is a request by the current master participant to an associate master participant for the associate master participant to assume the role of the master participant. The handover request packet from the master may be generated and sent to the associate master using the approach described above with reference to FIG. 5B.

Block 652 is reached from block 616 when the packet is determined to be a handover request packet intended for the recipient. In block 652, the associate master participant decodes the handover request packet and sends data to higher levels within the associate master participant device as necessary.

In block 654, the associate master participant determines whether to accept the handover request from the master participant and assume the responsibilities of the master participant. If so, then in block 660, the associate master participant generates an accept data packet. The accept data packet includes data that indicates to the master participant that the associate master participant will accept the role of master participant.

In block 662, the associate master participant hops to the next channel, according to the particular frequency hopping technique employed, and waits for its assigned time slot. In block 664, the associate master participant transmits the accept data packet to the master participant. In block 666, the associate master participant changes its state to assume the role of the master participant and the process returns to block 602.

If, in block 654, the associate master participant determines to not accept the handover request from the master participant, then in block 656, the associate master participant generates a reject data packet. The reject data packet includes data that indicates to the master participant that the associate master participant will not accept the role of master participant. In block 657, the associate master participant hops to the next channel, according to the particular frequency hopping technique employed, and waits for its assigned time slot. In block 658, the associate master participant transmits the reject data packet to the master participant and the process returns to block 602.

F. Promotion Request Packet

Figure 6F:
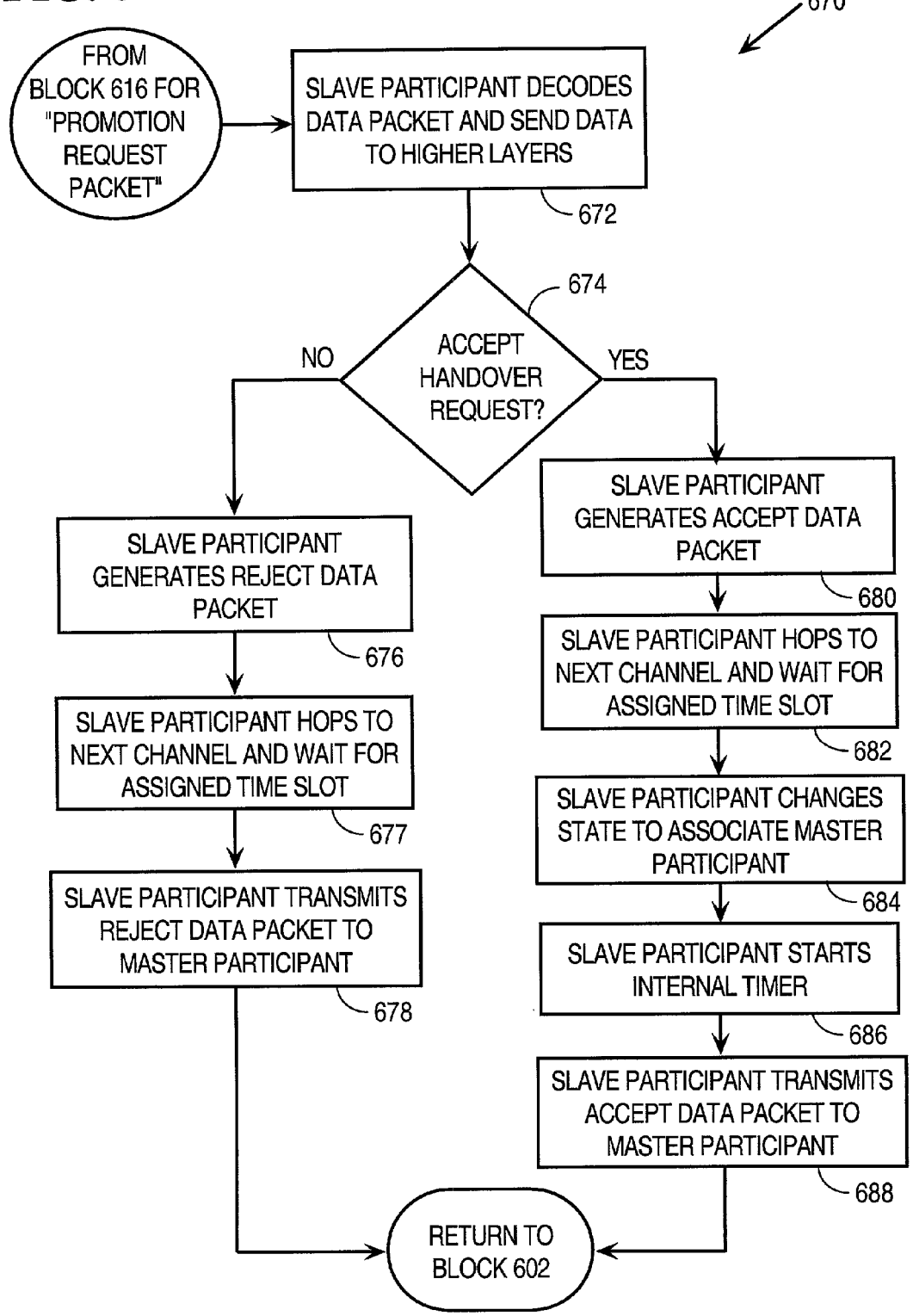
FIG. 6F is a flow diagram that depicts how a slave handles a promotion request packet from a master, according to an embodiment of the invention.

FIG. 6F is a flow diagram 670 that depicts how a slave handles a promotion request packet from a master, according to an embodiment of the invention. The promotion request packet requests that a slave participant accept a promotion to associate master participant. A master participant may request that a slave participant accept a promotion to associate master participant for several reasons. For example, a master participant may be attempting to designate the first associate master participant, a current associate master participant may have failed, or there may be a need for an additional associate master participant. The promotion request packet from the master may be generated and sent to the slave using the approach described above with reference to FIG. 5D.

Block 672 is reached from block 616 when the packet is determined to be a promotion request packet intended for the recipient. In block 672, the associate master participant decodes the handover request packet and sends data to higher levels within the associate master participant device as necessary. In block 674, the slave participant determines whether to accept the promotion request from the master participant and assume the responsibilities of the associate master participant.

If so, then in block 680, the slave participant generates an accept data packet. The accept data packet includes data that indicates to the master participant that the slave participant will accept the role of associate master participant. In block 682, the slave participant hops to the next channel, according to the particular frequency hopping technique employed, and waits for its assigned time slot. In block 684, the slave participant changes its state to assume the role of the associate master participant. In block 686, the former slave participant, having accepted the new role as associate master participant, starts its own internal timer, as previously described herein with respect to associate master participants. In block 688, the slave participant transmits the accept data packet to the master participant and the process returns to block 602. The order of blocks 680–688 may vary depending upon the requirements of a particular application and the invention is not limited to any particular order of performing these steps. For example, in a particular application, block 686 may be performed prior to block 684.

If, in block 674, the slave participant determines to not accept the promotion request from the master participant, then in block 676, the slave participant generates a reject data packet. The reject data packet includes data that indicates to the master participant that the slave participant will not accept the role of associate master participant. In block 677, the slave participant hops to the next channel, according to the particular frequency hopping technique employed, and waits for its assigned time slot. In block 678, the slave participant transmits the reject data packet to the master participant and the process returns to block 602.

VIII. Redemption of Channels

According to one embodiment of the invention, the number of channels that have acceptable performance is checked periodically and channels with unacceptable performance are redeemed if the number of channels with acceptable performance is below a specified threshold. As used herein, redeeming channels, or the redemption of channels, refers to increasing the number of channels that are classified as having acceptable performance. For example, channels may be redeemed between the master and one or more slaves. Although the examples herein are discussed in the context of a communications system comprised of a master and slaves, other approaches for configuring communications systems may be used, and the invention is not limited to a particular approach. Channel redemption may be performed by any participants or any other process or mechanism.

According to one embodiment of the invention, a master uses a timer to initiate a check on the number of good channels in the master's lookup table, and if the number of good channels is below a specified threshold, the master redeems bad channels to ensure that the number of good channels is above the specified threshold. The specified threshold may depend on the particular application or implementation, including but not limited to, such factors as the preferences of the users and/or operators of the communications system and the laws or regulations of the country in which the communication system is used.

Redemption of channels may be performed in a variety of ways. For example, the master may adjust the performance threshold used to determine whether a channel's performance is good or bad. By lowering the threshold, channels previously classified as bad may be reclassified as good. As another example, the performance threshold used to determine whether a channel is good or bad may be unchanged, but some of the performance measurements, or scores, may be increased so that some bad channels are reclassified as good channels.

The redemption of channels, and the check performed to determine whether channels should be redeemed, may be triggered in a number of ways. For example, a participant may use a timer and check whether channels should be redeemed when the timer expires. As another example, a participant may check at specified times or at random times. As yet another example, a participant may check based on the performance of the communications system.

Figure 7B:
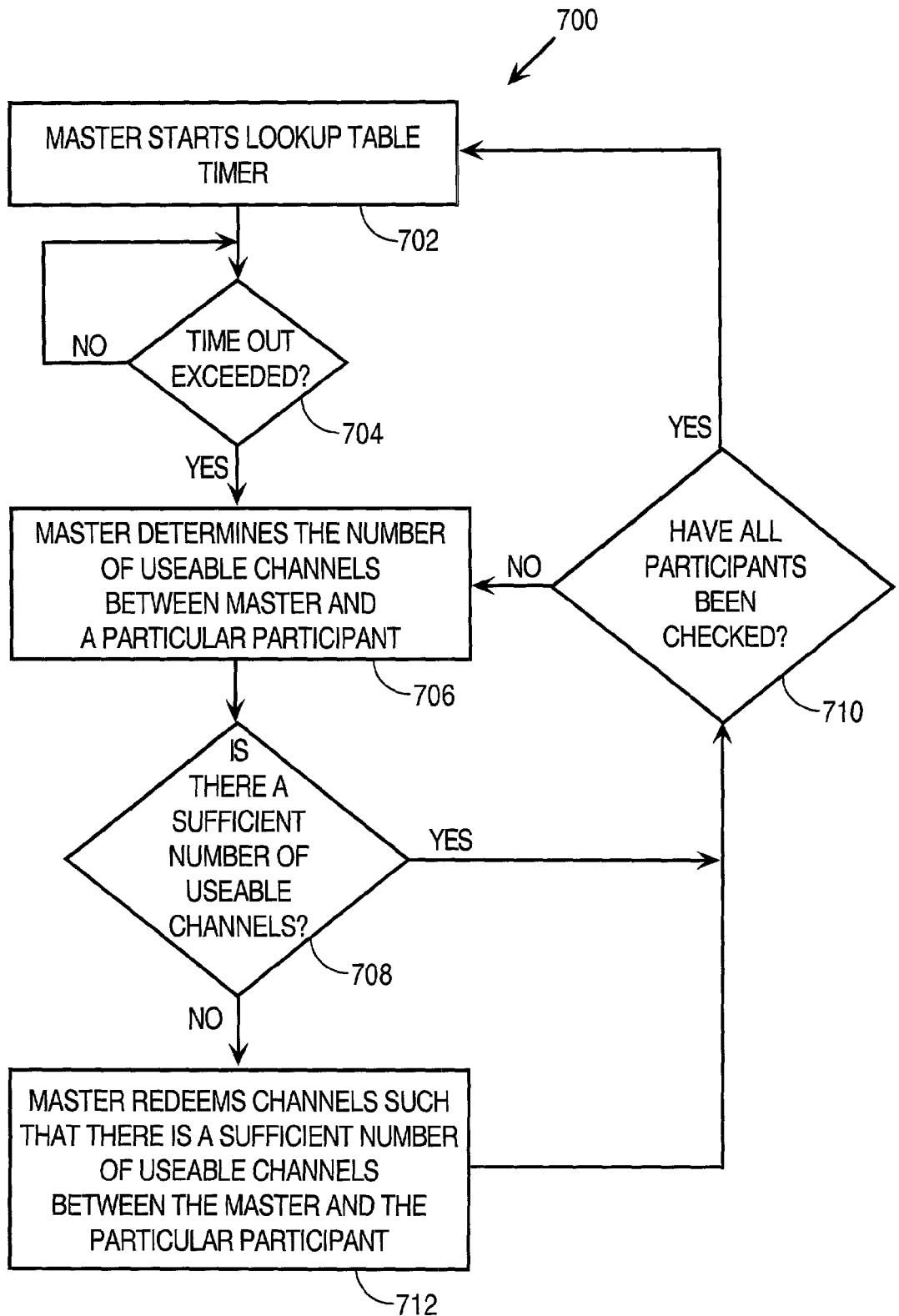
FIG. 7B is a flow diagram that depicts an approach for using a master to check whether communications channels should be redeemed, according to one embodiment of the invention.

FIG. 7B is a flow diagram 700 that depicts an approach by a master to check whether communications channels should be redeemed, according to one embodiment of the invention. While FIG. 7B describes the transmission of packets as being between a master and a slave, other participants may employ a similar approach for redeeming communications channels. Further, an associate master may be included in a communications arrangement that performs the channel redemption approach depicted in FIG. 7B, and if so, the associate master would function as a slave with respect to channel redemption by the master. Also, while FIG. 7B depicts a certain set of steps arranged in a particular order, the invention is not limited to the particular steps and order shown, and additional or fewer steps and other orderings of steps may be used in other implementations and communications systems.

In block 702, a master starts a lookup table timer.

In block 704, a determination is made whether a timeout, i.e., a specified period of time, has been exceeded. This may be determined, for example, by comparing the time to a specified value. If the timer equals or exceeds the specified value, the timeout has been exceeded. If the timeout is not exceeded, then control continues in block 704.

Once the timeout has been exceeded, then in block 706, the master determines the number of useable channels that are available between the master and a particular participant. For example, in a communications system with 50 channels, the master may determined that 23 of the 50 channels are classified as good between the master and a particular slave. A useable channel is a channel whose performance is considered acceptable, such as a good channel in a communications system that classifies channels as either good or bad.

In block 708, a determination is made whether there is a sufficient number of useable channels. For example, in the example above, the specified threshold for the minimum number of good channels may be 35 for the 50 channel communications system. If there are only 23 good channels, then there is not a sufficient number of useable channels.

If in block 708 a determination is made that there is a sufficient number of useable channels, the process continues to block 710 that is discussed below. If not, then the process continues to block 712 where the master redeems channels such that there is a sufficient number of useable channels between the master and the particular participant. For example, the master may increase the RSSI value for twelve channels that are closest to the performance threshold between good and bad channels, such that the number of good channels is 35, which satisfies the specified threshold for the number of useable channels in the above example.

In other implementations, the number of channels redeemed may be more than that required to increase the number of useable channels above the specified threshold. For example, sufficient channels may be redeemed to exceed the specified threshold by a specified amount such that there is an increased likelihood that the communications system will continue to have a sufficient number of useable channels for a longer time than might be the case if the number of channels was increased to just meet the specified threshold. As yet another example, an implementation may redeem all of the channels for the participant, which is similar to resetting the lookup table for the participant at the initialization of the communications system discussed above.

In block 710, a determination is made whether all the participants have been checked. If so, the process returns to block 702. If not, the process returns to block 706 where another participant in the communications system is checked. Blocks 706, 708 and, if necessary, block 712 are repeated for each participant in the communication system. However, in some implementations, fewer than all of the participants may be checked.

IX. Approach for Master Adaptive Selection of Participants

One problem that arises with the use of communications systems that use multiple channels is that inevitably nearly all channels will experience poor transmission quality at some time, resulting in reduced performance of the system because transmissions must be corrected or repeated. Prior approaches to addressing the poor transmission quality problem include increasing the transmission power of the communications devices making the transmissions. However, increased power leads to shorter battery life for mobile devices, increases the interference caused to other communications systems, and may not be effective for communications with participants that are near a source of interference that may block even the increased power transmissions.

According to one embodiment of the invention, a transmitting communication device selects the recipient of the transmission from a group of potential recipients based on channel performance. FIG. 1C, as discussed above, provides one example of this approach.

As another example, assume that the transmitting device is a master in a FH communications system. The channel on which the master is to transmit next may be determined by the frequency hopping sequence, say channel 82, and therefore the master is not free to choose the channel to use for the transmission. However, the master may not be limited in sending the transmission to a particular participant, such as if there are different transmissions to be made to several participants or if the same or a similar transmission is to be made to multiple participants. Therefore, the master may be able to select which participant to transmit to based on channel performance.

Assume for this example that master P4 of FIG. 1A has a similar message to transmit to slaves P1 and P2. If the master maintains a classification lookup table, the master may determine for which slave the channel is good instead of bad. In this example, assume that master P4's classification lookup table indicates that channel 82 is good for slave P2 but bad for slave P1. Master P4 may then choose to transmit the message to slave P2, thereby avoiding the performance problems associated with slave P1 that resulted in channel 82 being classified as bad between master P4 and slave Pl. Master P4 may then transmit the message to slave P1 on the next channel as determined from the frequency hopping sequence.

According to other aspects of the invention, the transmitting device may choose which participant to communicate with over a particular channel based on performance information for some or all transmissions. Alternatively, the transmitting device may check the performance data to determine if the channel to be used for the next transmission to the next participant is acceptable or not. If the performance is unacceptable, the transmitting device may then select another participant with which to communicate for whom the channel has acceptable performance.

Further, when selecting a particular participant with which to communicate, the transmitting device may select the first participant identified for which the channel is acceptable. Alternatively, the transmitting device may select the particular participant from among the participants for whom the channel performance is acceptable based on one or more selection criteria. For example, the transmitting device may select the participant with the best performance, or the transmitting device may select a participant whose performance exceeds a specified threshold that may be different than the specified threshold used to determine whether a channel's performance is good or bad.

X. Implementation Mechanisms

The approach for selecting communications channels and participants with which to communicate based on channel performance and transferring management functions between participants in a communications arrangement may be implemented in a wide variety of networks and contexts. For example, the approach may be implemented in any type of communications network, with or without the use of frequency hopping. For networks that employ frequency hopping, any type of frequency hopping scheme may be used. The approach may also be implemented with any type of network participants. For example, the approach may be implemented in wire-based networks or in wireless networks, where the participants are wireless devices or mobile devices. Furthermore, the functionality described herein may be implemented in participants or in separate processes or mechanisms, and the invention is not limited to any particular approach. Embodiments of the invention may be implemented in hardware, software, or any combination of hardware and software.

Figure 8:
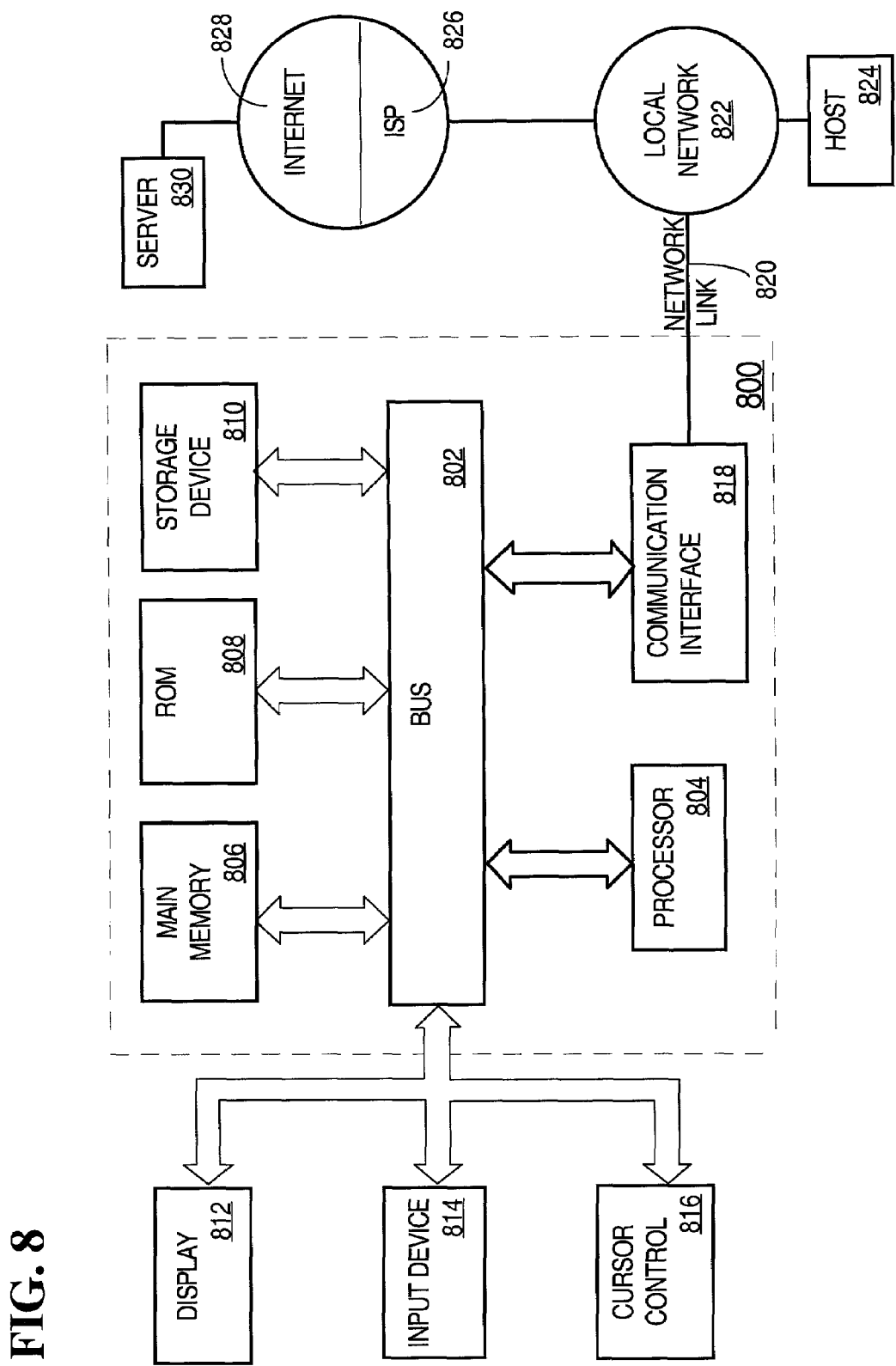
FIG. 8 is a block diagram of a computer system on which embodiments of the invention may be implemented.

FIG. 8 is a block diagram that depicts a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing a communications arrangement comprising a plurality of participants, the method comprising the computer-implemented steps of:
    assigning, to a first participant from the plurality of participants, one or more functions to be performed by the first participant;
    prior to a failure of the first participant that prevents the first participant from performing any of the one or more functions to be performed by the first participant,
        designating a second participant from the plurality of participants to perform the one or more functions if any of one or more handoff criteria are satisfied;
        the first participant communicating with the second participant to indicate that the second participant has been designated to perform the one or more functions if any of the one or more handoff criteria are satisfied;
    in response to any of the one or more handoff criteria being satisfied, assigning the one or more functions to the second participant; and
    selecting, based upon performance of a plurality of communications channels and at least one performance criterion, a first communications channel from a plurality of communications channels.

2. The method of claim 1, further comprising the computer-implemented steps of:
    generating channel identification data that identifies the first communications channel;
    providing the channel identification data over the first communications channel to one or more participants from the plurality of participants; and
    receiving at least a first communication from the one or more participants over a second communications channel from the plurality of communications channels, wherein the second communications channel is determined based on the channel identification data.

3. A computer-readable storage medium carrying one or more sequences of instructions for managing a communications arrangement comprising a plurality of participants, wherein execution of the one or more sequences of instructions by one or more processors causes the one or more processors to perform the steps of:

assigning, to a first participant from the plurality of participants, one or more functions to be performed by the first participant;

prior to a failure of the first participant that prevents the first participant from performing any of the one or more functions to be performed by the first participant, designating a second participant from the plurality of participants to perform the one or more functions if any of one or more handoff criteria are satisfied;

the first participant communicating with the second participant to indicate that the second participant has been designated to perform the one or more functions if any of the one or more handoff criteria are satisfied;

in response to any of the one or more handoff criteria being satisfied, assigning the one or more functions to the second participant; and selecting, based upon performance of a plurality of communications channels and at least one performance criterion, a first communications channel from a plurality of communications channels.

4. The computer-readable storage medium of claim 3, further comprising instructions which, when executed by the one or more processors, cause the one or more processors to carry out the steps of:

generating channel identification data that identifies the first communications channel;

providing the channel identification data over the first communications channel to one or more participants from the plurality of participants; and receiving a least a first communication from the one or more participate over a seconds communication channel from the plurality of communications channel, wherein the second communications channel is determined based on the channel identification data.

5. A method for assigning functions between participants and selecting communications channels in a communications arrangement comprising a plurality of participants, the method comprising the computer-implemented steps of:

assigning, to a first participant from the plurality of participants, one or more functions to be performed by the first participant;

prior to a failure of the first participant that prevents the first participant from performing any of the one or more functions to be performed by the first participant, designating a second participant from the plurality of participants to perform the one or more functions if any of one or more criteria are satisfied;

the first participant communicating with the second participant to indicate that the second participant has been designated to perform the one or more functions if any of the one or more handoff criteria are satisfied;

in response to any of the one or more criteria being satisfied, assigning the one or more functions to the second participant;

selecting, based upon performance of a plurality of communications channels and at least one specified criterion, a first communications channel from the plurality of communications channels;

generating channel identification data that identifies the first communications channel;

providing the channel identification data to one or more participants from the plurality of participants;

receiving at least a first communication from the one or more participants over a second communications channel from the plurality of communications channels, wherein the second communications channel is determined based on the channel identification data that identifies the first communications channel; and wherein the plurality of communications channels correspond to a set of frequencies and the first communication received from the one or more participants is based on a hopping sequence among at least two communications channels of the plurality of communications channels, according to a frequency hopping protocol.

6. The method of claim 5, wherein:

communications between the plurality of participants are made using a frequency hopping sequence according to a frequency hopping protocol;

the communications arrangement includes a wireless communications arrangement; and the plurality of participants includes a plurality of mobile devices.

7. The method of claim 5, wherein:

the one or more participants includes the second participant; and the second participant is designated by at least one other participant that is selected from the group comprising (a) the first participant, (b) the first participant and at least one other participant from the plurality of participants, and (c) one or more participants from the plurality of participants but not including the first participant.

8. The method of claim 5, wherein the channel identification data is first channel identification data, and wherein the method further comprises the computer-implemented steps of:

selecting, based upon the performance of the plurality of communications channels and the at least one specified criterion, a third communications channel from the plurality of communications channels;

generating second channel identification data that identifies the third communications channel;

providing the second channel identification data over a particular communications channel of the plurality of communications channels to one or more additional participants from the plurality of participants, wherein the particular communications channel is not the third communications channel; and receiving at least a second communication from the one or more additional participants over a fourth communications channel from the plurality of communications channels, wherein the fourth communications channel is determined based on the second channel identification data that identifies the third communications channel.

9. The method of claim 5, wherein the computer-implemented step of providing the channel identification data to the one or more participants further comprises the computer-implemented steps of:

providing the channel identification data to the one or more participants over a third communications channel of the plurality of communications channels, wherein the third communications channel is not the first communications channel;

determining the performance of the plurality of communications channels used by the plurality of participants; and wherein at least the first communication from the one or more participants includes data that indicates the performance of the third communications channel.

10. The method of claim 9, wherein:

the performance of the plurality of communications channels is determined based on a channel performance testing technique selected from the group consisting of a received signal strength indicator, a header error check, a cyclic redundancy check, and forward error correction;

the first communications device is a master participant;

the second communications device is an associate master participant; and the one or more communications devices are slave participants.

11. The method of claim 5, wherein the computer-implemented step of selecting the first communications channel from the plurality of communications channels further comprises the computer-implemented steps of:

classifying one or more communications channels of the plurality of communications channels based upon whether the performance of the one or more communications channels satisfies at least one performance criterion;

selecting the first communications channel from the one or more communications channels that are classified as satisfying the at least one performance criterion; and the method further comprises the computer-implemented steps of:

determining a number of communications channels of the plurality of communications channels that satisfy the at least one performance criterion; and if the number of communications channels that satisfy the at least one performance criterion is less than a specified number, reclassifying one or more communications channels of the plurality of communications channels.

12. The method of claim 5, wherein:

the one or more criteria include the failure of the first participant;

the first participant is a master participant that performs the steps of selecting, generating, providing, and receiving, the second participant is a slave participant prior to being assigned to perform the one or more functions, the second participant is an associate master participant after being designated to perform the one or more functions if any of the one or more criteria are satisfied, and the one or more participants include one or more slave participants.

13. The method of claim 5, further comprising the computer-implemented steps of:

determining the performance of the plurality of communications channels by performing the computer-implemented steps of:

sending a request for performance data to at least one participant of the plurality of participants;

in response to the request, receiving performance data from the at least one participant; and creating and maintaining performance data that indicates the performance of one or more communications channels of the plurality of communications channels for communications with one or more participants from the plurality of participants.

14. A first communications device comprising:

an interface that is configured to receive data from a plurality of communications devices and to transmit data to the plurality of communications devices; and a mechanism that is communicatively coupled to the interface and configured to:

perform one or more functions;

prior to a failure of the communications device that prevents the communications device from performing any of the one or more functions, designate a second communications device from the plurality of communications devices to perform the one or more functions if any of a set of criteria are satisfied;

communicate with the second communications device to indicate that the second communications device has been designated to perform the one or more functions if any of the one or more handoff criteria are satisfied;

select, based upon performance of a plurality of communications channels, a first communications channel from the plurality of communications channels;

generate first channel identification data that identifies the first communications channel;

provide the first channel identification data to one or more communications devices from the plurality of communications devices; and receive at least a first communication from the one or more communications devices over a second communications channel from the plurality of communications channels, wherein the second communications channel is determined based on the first channel identification data that identifies the first communications channel; and wherein the plurality of communications channels correspond to a set of frequencies and the first communication received from the one or more communications devices is based on a hopping sequence among at least two communications channels of the plurality of communications channels, according to a frequency hopping protocol.

15. The first communications device of claim 14, wherein:

communications between the plurality of communications devices are made using a frequency hopping sequence according to a frequency hopping protocol; and the first communications device, the second communications device, and the one or more communications devices are wireless communications devices; and the plurality of communications devices includes a plurality of mobile communications devices.

16. The first communications device of claim 14, wherein the mechanism is further configured to:

select, based upon the performance of the plurality of communications channels and at least one performance criterion, a third communications channel from the plurality of communications channels;

generate second channel identification data that identifies the third communications channel;

provide the second channel identification data over a particular communications channel of the plurality of communications channels to one or more additional communications devices from the plurality of communications devices, wherein the particular communications channel is not the third communications channel; and receive at least a second communication from the one or more additional communications devices over a fourth communications channel from the plurality of communications channels, wherein the fourth communications channel is determined based on the second channel identification data that identifies the third communications channel.

17. The first communications device of claim 14, wherein the mechanism is further configured to:
provide the channel identification data to the one or more communications devices over a specified communications channel of the plurality of communications channels, wherein the specified communications channel is not the first communications channel;
determine the performance of the plurality of communications channels used by the plurality of communications devices; and
wherein at least the first communication from the one or more communications devices includes performance data that indicates the performance of the specified communications channel.

18. The first communications device of claim 17, wherein:
the performance of the plurality of communications channels is determined based on a channel performance testing technique selected from the group consisting of a received signal strength indicator, a header error check, a cyclic redundancy check, and forward error correction;
the first communications device is a master participant;
the second communications device is an associate master participant; and
the one or more communications devices are slave participants.

19. The first communications device of claim 14, wherein the mechanism is further configured to:
classify one or more communications channels of the plurality of communications channels based upon whether the performance of the one or more communications channels satisfies at least one performance criterion;
select the first communications channel from the one or more communications channels that are classified as satisfying the at least one performance criterion;
determine a number of communications channels of the plurality of communications channels that satisfy the at least one performance criterion; and
if the number of communications channels that satisfy the at least one performance criterion is less than a specified number, reclassify one or more communications channels of the plurality of communications channels.

20. The, first communications device of claim 14, wherein the mechanism is further configured to:
determine the performance of the plurality of communications channels by performing the computer-implemented steps of:
sending a request for performance data to at least one participant from the plurality of participants;
in response to the request, receiving performance data from the at least one participant; and
creating and maintaining performance data that indicates the performance of one or more communications channels of the plurality of communications channels for communications with one or more participants from the plurality of participants.

21. The first communications device of claim 14, wherein:
the one or more criteria include the failure of the first communications device;
the first communications device is a master communications device,
the second communications device is a slave communications device prior to being assigned to perform the one or more functions,
the second communications device is an associate master communications device after being designated to perform the one or more functions if any of the one or more criteria are satisfied, and
the one or more participants include one or more slave communications devices.

22. A computer-readable storage medium carrying one or more sequences of instructions for assigning functions between participants and selecting communications channels in a communications arrangement comprising a plurality of participants, wherein execution of the one or more sequences of instructions by one or more processors causes the one or more processors to perform the steps of:
assigning, to a first participant from the plurality of participants, one or more functions to be performed by the first participant;
prior to a failure of the first participant that prevents the first participant from performing any of the one or more functions to be performed by the first participant,
designating a second participant from the plurality of participants to perform the one or more functions if any of one or more criteria are satisfied;
the first participant communicating with the second participant to indicate that the second participant has been designated to perform the one or more functions if any of the one or more handoff criteria are satisfied;
in response to any of the one or more criteria being satisfied, assigning the one or more functions to the second participant;
selecting, based upon performance of a plurality of communications channels and at least one specified criterion, a first communications channel from the plurality of communications channels;
generating channel identification data that identifies the first communications channel;
providing the channel identification data to a third participant from the plurality of participants;
receiving a first communication from the third participant over a second communications channel from the plurality of communications channels, wherein the second communications channel is determined based on the channel identification data that identifies the first communications channel; and
wherein the plurality of communications channels correspond to a set of frequencies and the first communication received from the one or more participants is based on a hopping sequence among at least two communications channels of the plurality of communications channels, according to a frequency hopping protocol.

23. The computer-readable storage medium of claim 22, wherein:
communications between the plurality of participants are made using a frequency hopping sequence according to a frequency hopping protocol;
the communications arrangement includes a wireless communications arrangement; and the plurality of participants includes a plurality of mobile devices.

24. The computer-readable storage medium of claim 22, wherein the channel identification data is first channel identification data, and wherein the computer-readable storage medium further comprises one or more sequences of instructions which, when executed by the one or more processors, causes the one or more processors to perform the steps of:
- selecting, based upon the performance of the plurality of communications channels and the at least one specified criterion, a third communications channel from the plurality of communications channels;
- generating second channel identification data that identifies the third communications channel;
- providing the second channel identification data over a particular communications channel of the plurality of communications channels to one or more additional participants from the plurality of participants, wherein the particular communications channel is not the third communications channel; and
- receiving at least a second communication from the one or more additional participants over a fourth communications channel from the plurality of communications channels, wherein the fourth communications channel is determined based on the second channel identification data that identifies the third communications channel.

25. The computer-readable storage medium of claim 22, wherein the instructions for providing the channel identification data to the one or more participants further comprises one or more sequences of instructions which, when executed by the one or more processors, causes the one or more processors to perform the steps of:
- providing the channel identification data to the one or more participants over a third communications channel of the plurality of communications channels, wherein the third communications channel is not the first communications channel;
- determining the performance of the plurality of communications channels used by the plurality of participants; and
- wherein at least the first communication from the one or more participants includes data that indicates the performance of the third communications channel.

26. The computer-readable storage medium of claim 25, wherein:
- the performance of the plurality of communications channels is determined based on a channel performance testing technique selected from the group consisting of a received signal strength indicator, a header error check, a cyclic redundancy check, and forward error correction;
- the first communications device is a master participant;
- the second communications device is an associate master participant; and
- the one or more communications devices are slave participants.

27. The computer-readable storage medium of claim 22, wherein the instructions for selecting the first communications channel from the plurality of communications channels further comprises one or more sequences of instructions which, when executed by the one or more processors, causes the one or more processors to perform the steps of:
- classifying one or more communications channels of the plurality of communications channels based upon whether the performance of the one or more communications channels satisfies at least one performance criterion;
- selecting the first communications channel from the one or more communications channels that are classified as satisfying the at least one performance criterion; and
- the method further comprises the computer-implemented steps of:
- determining a number of communications channels of the plurality of communications channels that satisfy the at least one performance criterion; and
- if the number of communications channels that satisfy the at least one performance criterion is less than a specified number, reclassifying one or more communications channels of the plurality of communications channels.

28. The computer-readable storage medium of claim 22, further comprising one or more sequences of instructions which, when executed by the one or more processors, causes the one or more processors to perform the steps of:
- determining the performance of the plurality of communications channels by performing the computer-implemented steps of:
  - sending a request for performance data to at least one participant from the plurality of participants;
  - in response to the request, receiving performance data from the at least one participant; and
  - creating and maintaining performance data that indicates the performance of one or more communications channels of the plurality of communications channels for communications with one or more participants from the plurality of participants.

29. The computer-readable storage medium of claim 22, wherein:
- the one or more criteria include the failure of the first participant;
- the first participant is a master participant that performs the steps of selecting, generating, providing, and receiving,
- the second participant is a slave participant prior to being assigned to perform the one or more functions,
- the second participant is an associate master participant after being designated to perform the one or more functions if any of the one or more criteria are satisfied, and
- the one or more participants include one or more slave participants.

30. The computer-readable storage medium of claim 22, wherein:
- the one or more participants includes the second participant; and
- the second participant is designated by at least one other participant that is selected from the group comprising (a) the first participant, (b) the first participant and at least one other participant from the plurality of participants, and (c) one or more participants from the plurality of participants but not including the first participant.

* * * * *

UNITED STATES PATENT AND TRADEMARK OFFICE
CERTIFICATE OF CORRECTION

| | | |
|---|---|---|
| PATENT NO. | : 7,222,166 B2 | Page 1 of 1 |
| APPLICATION NO. | : 10/052019 | |
| DATED | : May 22, 2007 | |
| INVENTOR(S) | : Bijan Treister et al. | |

It is certified that error appears in the above-identified patent and that said Letters Patent is hereby corrected as shown below:

In the Claims:

Claim 4, Column 41, line 11, replace "more participate over a seconds communication chan-" with --more participants over a second communications chan--

Claim 4, Column 41, line 12, replace "channel," with --channels,--

Signed and Sealed this

Twenty-fourth Day of July, 2007

JON W. DUDAS
*Director of the United States Patent and Trademark Office*